(12) United States Patent
Tokuchi

(10) Patent No.: US 11,223,729 B2
(45) Date of Patent: Jan. 11, 2022

(54) INFORMATION PROCESSING APPARATUS AND NON-TRANSITORY COMPUTER READABLE MEDIUM FOR INSTRUCTING AN OBJECT TO PERFORM A SPECIFIC FUNCTION

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 180 days.

(21) Appl. No.: 16/412,510

(22) Filed: May 15, 2019

(65) Prior Publication Data
US 2019/0373118 A1 Dec. 5, 2019

(30) Foreign Application Priority Data
May 29, 2018 (JP) .............................. JP2018-102769

(51) Int. Cl.
| | | |
|---|---|---|
| H04N 1/00 | (2006.01) | |
| G06F 3/12 | (2006.01) | |
| H04N 1/327 | (2006.01) | |
| G06F 3/01 | (2006.01) | |
| G06F 3/0482 | (2013.01) | |

(52) U.S. Cl.
CPC ......... *H04N 1/00381* (2013.01); *G06F 3/016* (2013.01); *G06F 3/017* (2013.01); *G06F 3/1204* (2013.01); *G06F 3/1237* (2013.01); *G06F 3/1292* (2013.01); *H04N 1/32776* (2013.01); *G06F 3/011* (2013.01); *G06F 3/0482* (2013.01); *G06F 3/1275* (2013.01)

(58) Field of Classification Search
None
See application file for complete search history.

(56) References Cited

U.S. PATENT DOCUMENTS

| | | | |
|---|---|---|---|
| 9,310,883 B2* | 4/2016 | Weising | A63F 13/50 |
| 2009/0135135 A1* | 5/2009 | Tsurumi | G06F 3/04845 345/156 |
| 2012/0326966 A1 | 12/2012 | Rauber | |
| 2015/0055168 A1* | 2/2015 | Kato | H04N 1/0035 358/1.15 |
| 2016/0316081 A1* | 10/2016 | Matsuki | G06F 3/0304 |
| 2018/0374387 A1* | 12/2018 | Shiose | G06F 3/0304 |
| 2019/0266393 A1* | 8/2019 | Tokuchi | G06T 7/246 |
| 2019/0373119 A1* | 12/2019 | Tokuchi | G06F 3/017 |

FOREIGN PATENT DOCUMENTS

| | | |
|---|---|---|
| JP | 2013-172432 A | 9/2013 |
| JP | 2014-520339 A | 8/2014 |

* cited by examiner

*Primary Examiner* — Miya J Williams
(74) *Attorney, Agent, or Firm* — Oliff PLC

(57) ABSTRACT

An information processing apparatus that is used in contact with a user includes a detection unit and a control unit. The detection unit detects a motion of the user in a real space performed without contacting an object that is present in the real space. The control unit instructs the object to execute a specific function in the case where plural motions by users for a common object are detected. The specific function is correlated with the plural motions.

19 Claims, 37 Drawing Sheets

| | USER A | USER B | USER C | USER D |
|---|---|---|---|---|
| PRINTING | ABLE TO PERFORM OPERATION ALONE | ABLE TO PERFORM OPERATION ALONE | ABLE TO PERFORM OPERATION WITH AUTHENTICATION BY USER B | ABLE TO PERFORM OPERATION ALONE |
| FACSIMILE TRANSMISSION | ABLE TO PERFORM OPERATION ALONE | ABLE TO PERFORM OPERATION ALONE | ABLE TO PERFORM OPERATION WITH AUTHENTICATION BY USER B | ABLE TO PERFORM OPERATION WITH INPUT OF AREA CODE BY USER A |
| CHANGING PRINTING COLOR TINT | NOT ABLE TO PERFORM OPERATION | ABLE TO PERFORM OPERATION ALONE | ABLE TO PERFORM OPERATION WITH AUTHENTICATION BY USER B | ABLE TO PERFORM OPERATION WITH AUTHENTICATION BY USER B |
| CHANGING ADDRESS BOOK | NOT ABLE TO PERFORM OPERATION | ABLE TO PERFORM OPERATION WITH AUTHENTICATION BY USER D | ABLE TO PERFORM OPERATION WITH AUTHENTICATION BY USER D | ABLE TO PERFORM OPERATION ALONE |
| TONE CORRECTION | NOT ABLE TO PERFORM OPERATION | ABLE TO PERFORM OPERATION WITH AUTHENTICATION BY USER D | ABLE TO PERFORM OPERATION WITH AUTHENTICATION BY USER D | ABLE TO PERFORM OPERATION ALONE |
| AUTHENTICATION | NOT ABLE TO PERFORM OPERATION | ABLE TO PERFORM OPERATION ALONE | NOT ABLE TO PERFORM OPERATION | ABLE TO PERFORM OPERATION ALONE |

FIG. 20

| | USER A | USER B | USER C |
|---|---|---|---|
| OPENING OPERATION | ABLE TO PERFORM OPERATION SENSITIVITY: (UNITY MAGNIFICATION) | ABLE TO PERFORM OPERATION (SENSITIVITY: 1.5 TIMES) | ABLE TO PERFORM OPERATION (SENSITIVITY: HALF) |
| CLOSING OPERATION | ABLE TO PERFORM OPERATION SENSITIVITY: (UNITY MAGNIFICATION) | ABLE TO PERFORM OPERATION (SENSITIVITY: TWICE) | NOT ABLE TO PERFORM OPERATION |
| LOCKING | NOT ABLE TO PERFORM OPERATION | ABLE TO PERFORM OPERATION ALONE | ABLE TO PERFORM OPERATION TOGETHER WITH USER B |
| UNLOCKING | NOT ABLE TO PERFORM OPERATION | ABLE TO PERFORM OPERATION ALONE | ABLE TO PERFORM OPERATION TOGETHER WITH USER B |

254A2

FIG. 22A
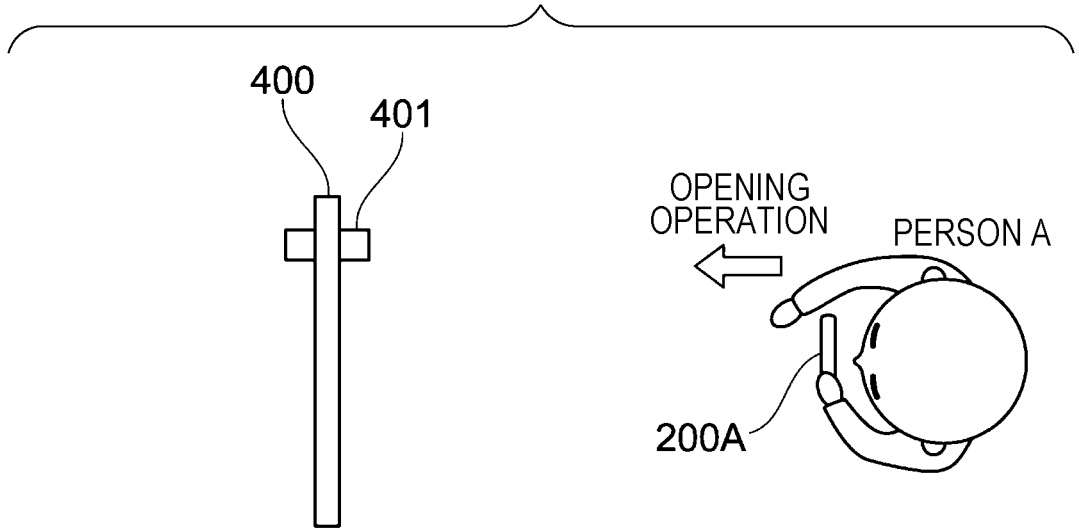
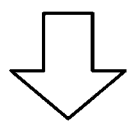
FIG. 22B
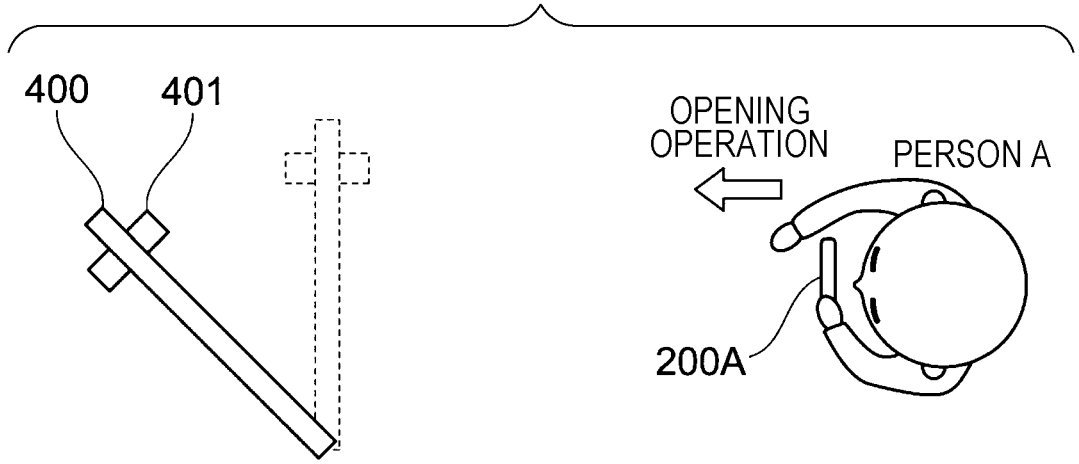

↓ COMBINE WEIGHTED OPERATIONS

WHEN WEIGHTED OPERATIONS ARE BALANCED

WEIGHTED OPERATION BY PERSON A
> WEIGHTED OPERATION BY PERSON B

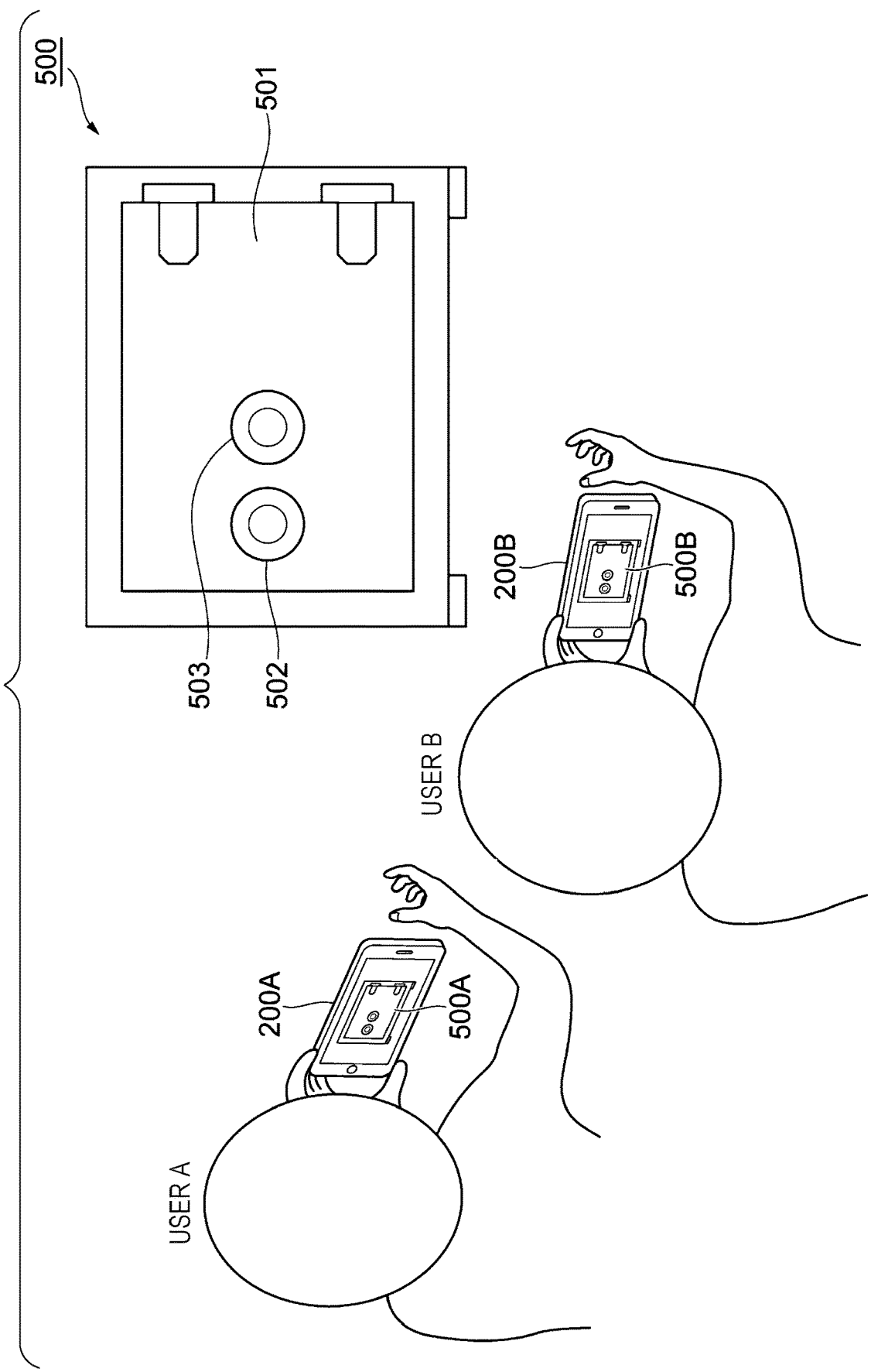

| | USER A | USER B | USER C | USER D |
|---|---|---|---|---|
| UNLOCKING OPERATION 1 | ABLE TO OPERATE LEFT DIAL LOCK | ABLE TO OPERATE RIGHT DIAL LOCK | NOT ABLE TO PERFORM OPERATION | NOT ABLE TO PERFORM OPERATION |
| UNLOCKING OPERATION 2 | NOT ABLE TO PERFORM OPERATION | ABLE TO OPERATE LEFT DIAL LOCK | ABLE TO OPERATE RIGHT DIAL LOCK | NOT ABLE TO PERFORM OPERATION |
| UNLOCKING OPERATION 3 | ABLE TO OPERATE RIGHT DIAL LOCK | NOT ABLE TO PERFORM OPERATION | NOT ABLE TO PERFORM OPERATION | ABLE TO OPERATE LEFT DIAL LOCK |

FIG. 29
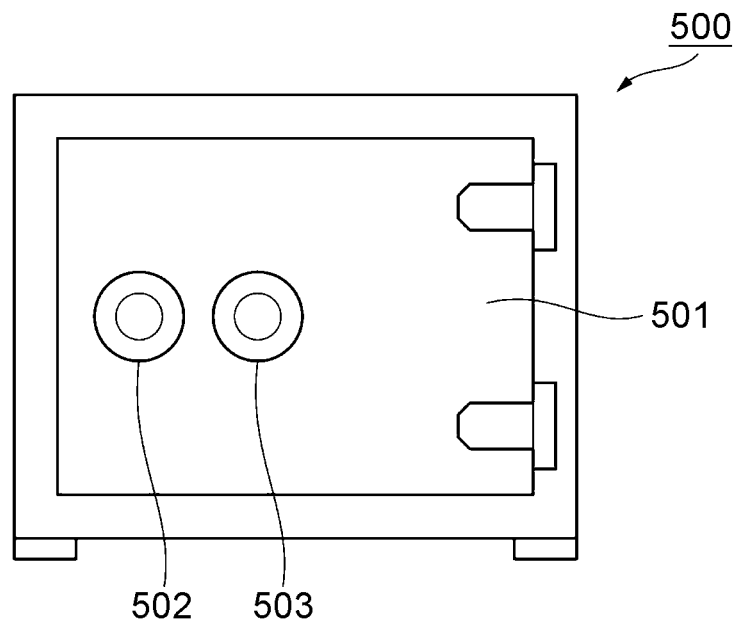
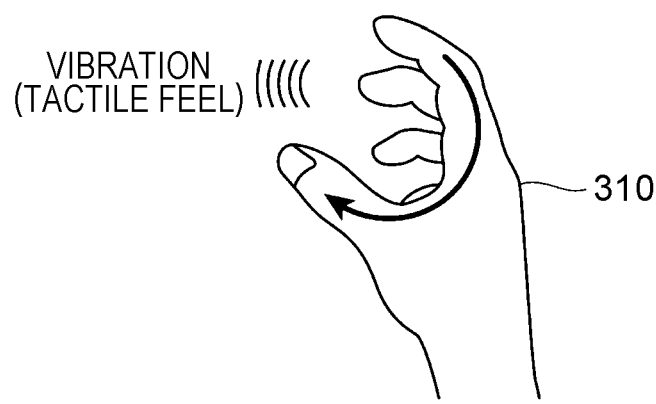
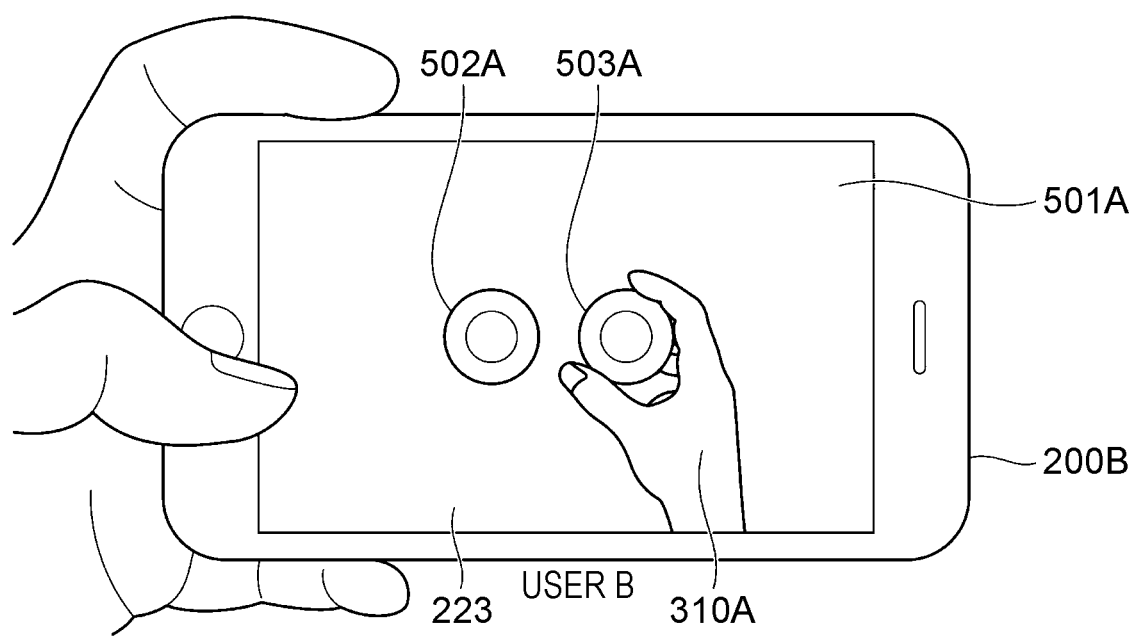

INFORMATION PROCESSING APPARATUS AND NON-TRANSITORY COMPUTER READABLE MEDIUM FOR INSTRUCTING AN OBJECT TO PERFORM A SPECIFIC FUNCTION

CROSS-REFERENCE TO RELATED APPLICATIONS

This application is based on and claims priority under 35 USC 119 from Japanese Patent Application No. 2018-102769 filed May 29, 2018.

BACKGROUND (i) Technical Field

The present disclosure relates to an information processing apparatus and a non-transitory computer readable medium.

(ii) Related Art

There is provided a technique of recognizing a device included in an image captured using a camera built in a portable device operated by a user and displaying a virtual user interface corresponding to the recognized device in an augmented reality space to allow operating the device through the virtual user interface. (See Japanese Unexamined Patent Application Publication No. 2013-172432, for example.)

SUMMARY

The device is operated on the basis of an instruction given through contact by the user.

Aspects of non-limiting embodiments of the present disclosure relate to operating an object that is present in the real space without using an operation through contact by the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus that is used in contact with a user, including: a detection unit that detects a motion of the user in a real space performed without contacting an object that is present in the real space; and a control unit that instructs the object to execute a specific function in a case where a plurality of motions by users for a common object: are detected, the specific function being correlated with the plurality of motions.

BRIEF DESCRIPTION OF THE DRAWINGS

Exemplary embodiments of the present disclosure will be described in detail based on the following figures, wherein:

FIG. 5 illustrates an example of a table provided to operate the image forming apparatus;

FIG. 20 illustrates an example of a table that is used to operate a door;

FIGS. 22A and 22B illustrate an example of an operation for a case where the operator is the user A alone;

FIG. 26 illustrates an example of a system according to a third exemplary embodiment;

FIG. 28 illustrates an example of a table that is used to operate the safe;

FIG. 29 illustrates an example in which the user B captures an image of his/her own right hand as superposed on a right dial lock image;

DETAILED DESCRIPTION

Exemplary embodiments of the present disclosure will be described below with reference to the drawings.

First Exemplary Embodiment

System Example

Figure 1:
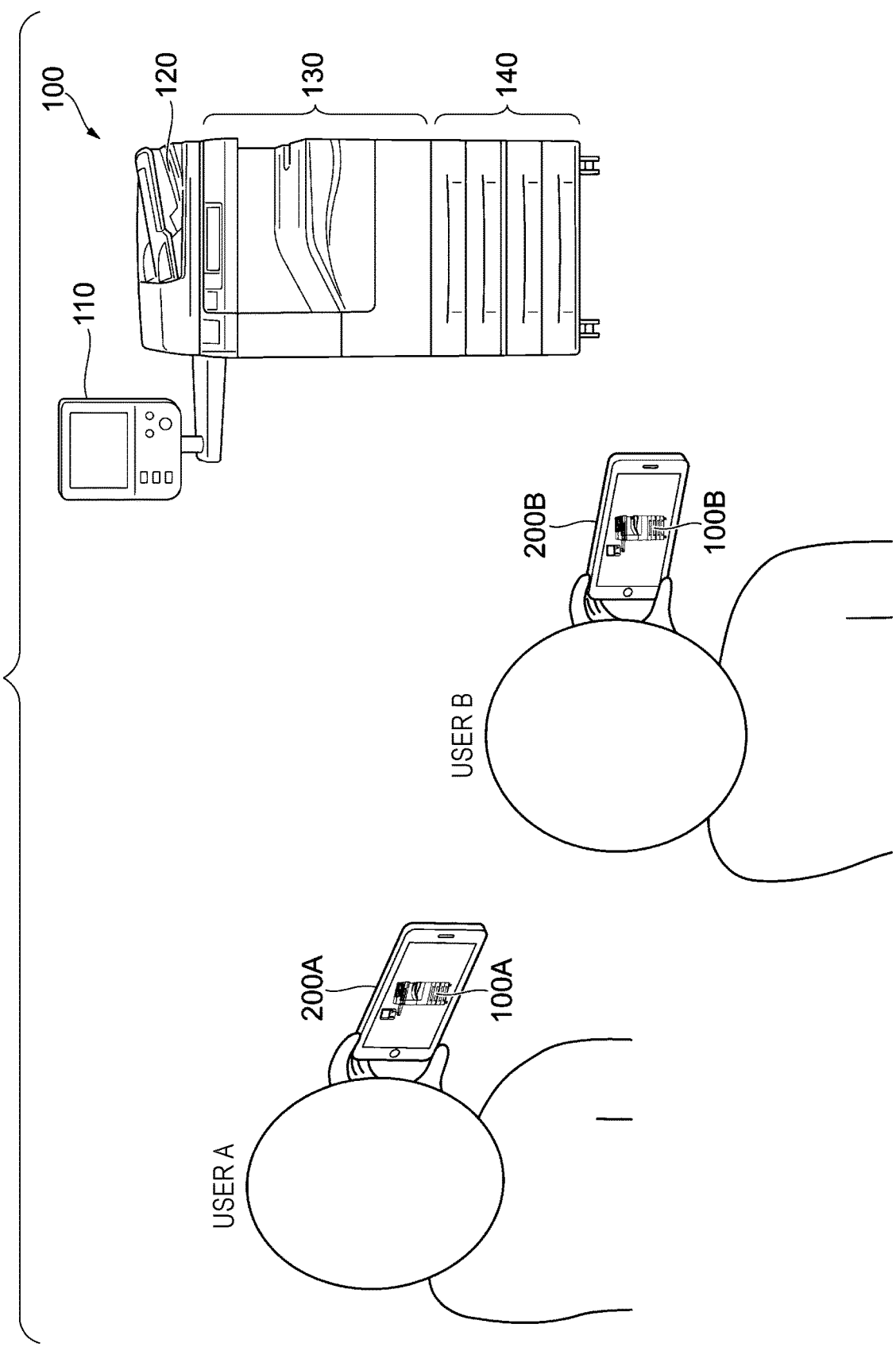
FIG. 1 illustrates an example of a system according to a first exemplary embodiment.

FIG. 1 illustrates an example of a system according to a first exemplary embodiment.

The system illustrated in FIG. 1 includes an image forming apparatus 100 that forms an image on a recording material (hereinafter occasionally referred to representatively as "paper"), and two smartphones 200A and 200B that capture an image of the image forming apparatus 100.

The image forming apparatus 100 is an example of an object that is present in the real space as the operation target.

The image forming apparatus 100 according to the present embodiment has a copy function of generating a duplicate, a scan function of reading an image of a document, a facsimile transmission/reception function of transmitting and receiving a facsimile image to and from another device, a print function of recording an image on paper, etc. The copy function is implemented by combining the scan function and the print function.

It is not necessary that the image forming apparatus 100 should have all of the copy function, the scan function, and the facsimile transmission/reception function, and the image forming apparatus 100 may be an apparatus that specializes in one of such functions such as a copier, a scanner, a facsimile transmitter/receiver, or a printing apparatus, for example.

The image forming apparatus 100 may also be an apparatus that has a combination of several functions selected from such functions.

The image forming apparatus 100 includes a user interface section 110 that is used to receive an operation from a user and present various kinds of information to the user, an image reading unit 120 that reads an image of a document, an image forming unit 130 that records an image on paper, and a housing section 140 that houses the paper.

The smartphones 200A and 200B are each a portable terminal apparatus, and include a camera for image capture, a display screen, a communication function, etc. as discussed later.

The smartphones 200A and 200B are each an example of an information processing apparatus.

In the case of the present embodiment, the smartphone 200A is operated by a user A, and the smartphone 200B is operated by a user B.

Images 100A and 100B of the image forming apparatus 100 are displayed on the respective display screens of the smartphones 200A and 200B illustrated in FIG. 1.

In the following, the smartphones 200A and 200B will occasionally be referred to collectively as smartphones 200.

<Configuration of Image Forming Apparatus>

Figure 2:
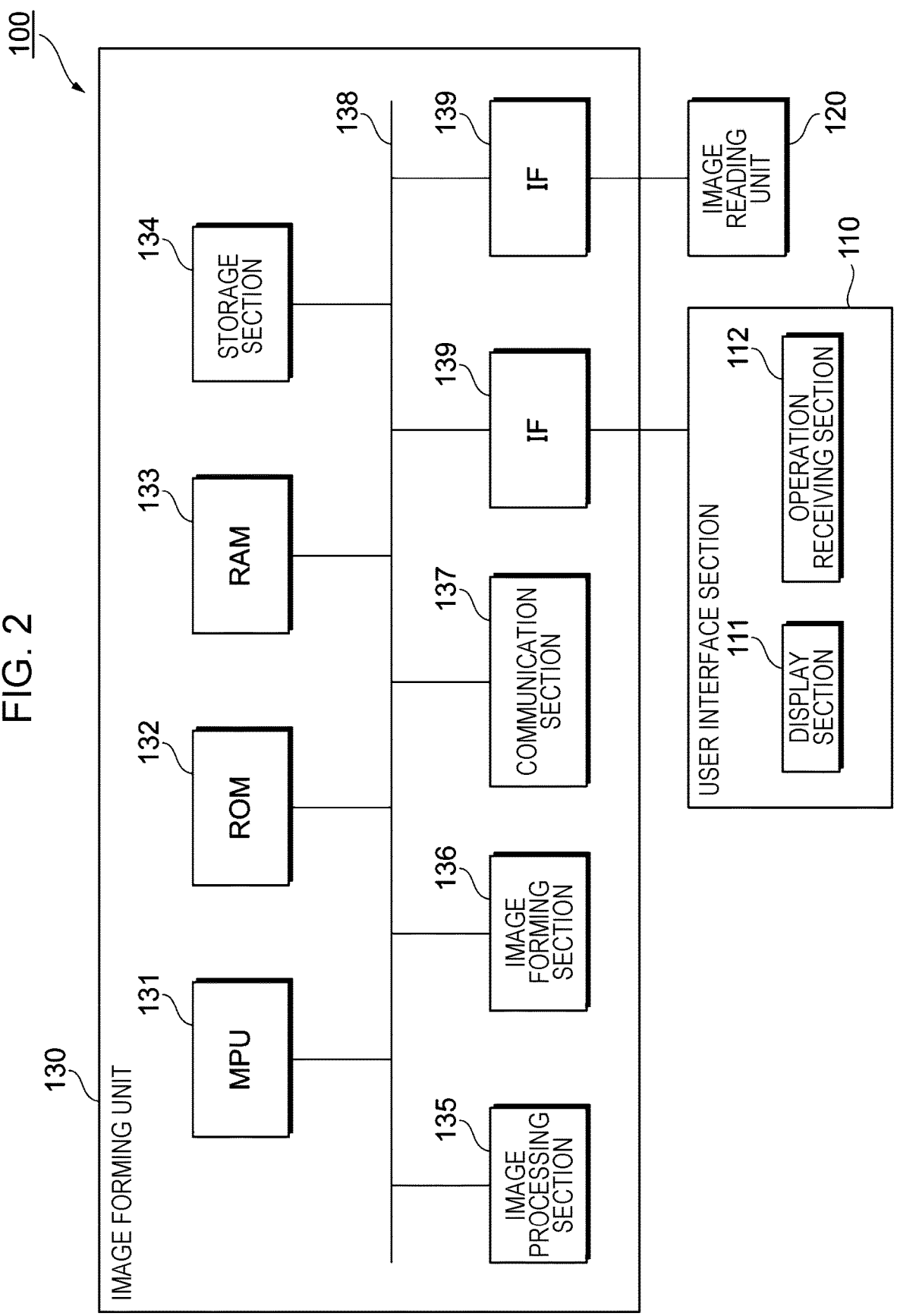
FIG. 2 illustrates an example of the hardware configuration of an image forming apparatus.

FIG. 2 illustrates an example of the hardware configuration of the image forming apparatus 100.

Portions in FIG. 2 corresponding to those in FIG. 1 are denoted by the corresponding reference numerals.

The user interface section 110 includes a display section 111 that is used to display an operation screen etc., and an operation receiving section 112 that receives an operation input by the user.

The display section 111 includes a liquid crystal display panel, an organic electro-luminescence (EL) display panel, or the like, for example.

The operation receiving section 112 includes a button, a touch pad, or the like that receives an operation input by the user.

The image reading unit 120 includes an image reading section that reads an image from a document, and a document transport section that transports the document to the image reading section. The image reading unit 120 is disposed on top of the image forming unit 130.

The image forming unit 130 includes a micro processing unit (MPU) 131 that functions as a control section, a read only memory (ROM) 132, and a random access memory (RAM) 133.

The MPU 131 provides various kinds of functions by executing a program such as firmware read from the ROM 132. The RAM 133 is used as a work area for the program.

Besides, the image forming unit 130 includes a storage section 134 that is used to store image data etc., an image processing section 135 that performs image processing such as color correction and tone correction on the image data, an image forming section 136 that forms an image on paper using an electrophotographic system or an inkjet system, a communication section 137 that is used for external communication, etc.

The storage section 134 includes a non-volatile storage medium such as a hard disk apparatus or a semiconductor memory. The storage section 134 stores image data on a document read by the image reading unit 120 and image data received through the communication section 137.

The image processing section 135 includes a dedicated processor or processing board, for example.

The communication section 137 includes a local area network (LAN) interface or an interface for a facsimile communication network service. The LAN interface is used for communication with the smartphone 200 (see FIG. 1) discussed earlier.

The MPU 131, the ROM 132, the RAM 133, the storage section 134, the image processing section 135, the image forming section 136, and the communication section 137 are connected to each other through a bus 138. The user interface section 110 and the image reading unit 120 discussed earlier are connected to the bus 138 through an interface 139.

<Configuration of Smartphone>

Figure 3:
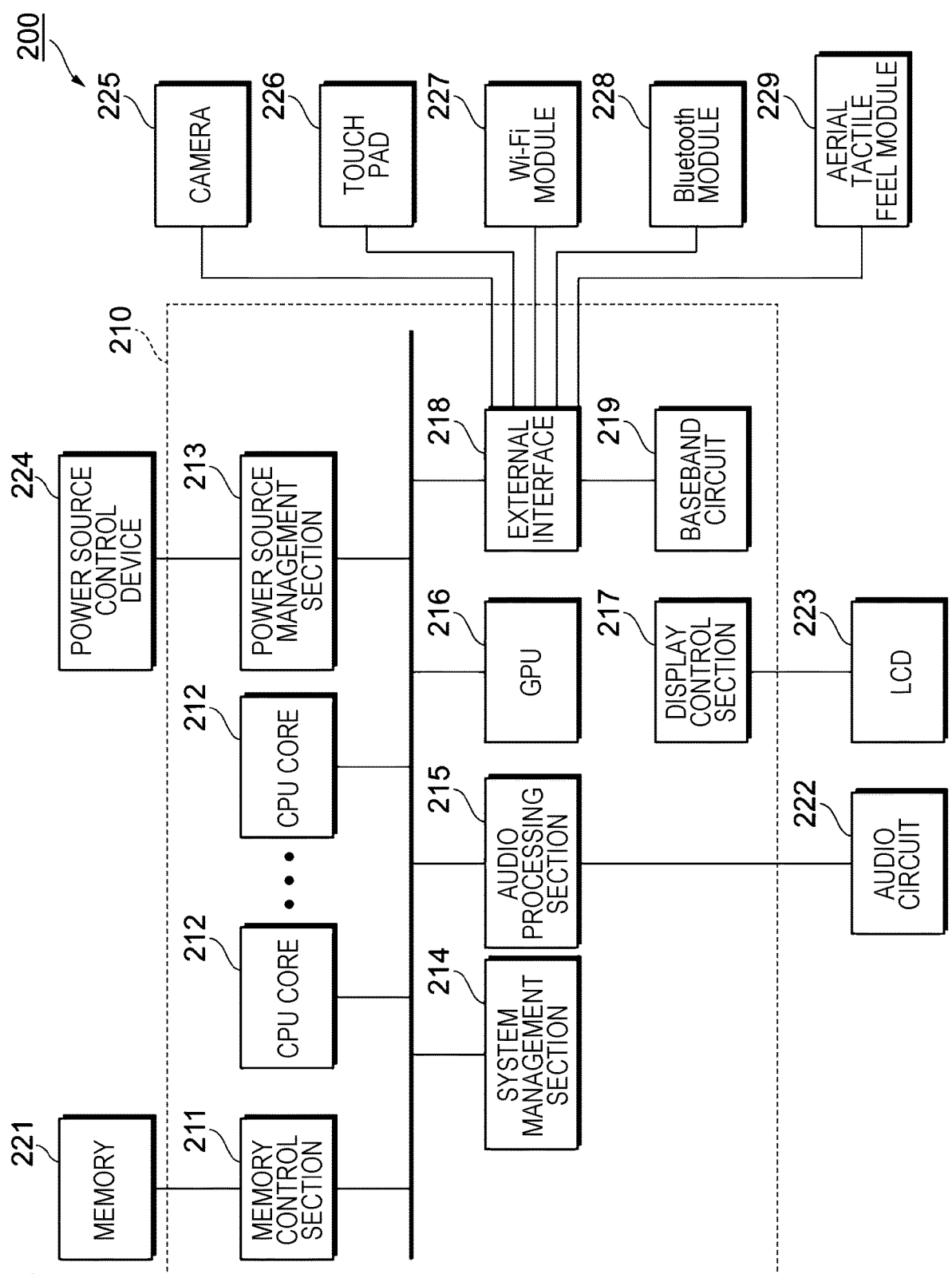
FIG. 3 illustrates an example of the hardware configuration of a smartphone.

FIG. 3 illustrates an example of the hardware configuration of the smartphone 200.

The smartphone 200 includes a processing circuit section 210 that processes data, a non-volatile memory 221 that stores a program and data, an audio circuit 222 that receives and outputs an audio signal, a liquid crystal display (LCD) 223 that displays an image, a power source control device 224, a camera 225 that captures an image, a touch pad 226 that detects contact with an operation surface, a Wi-Fi (Wireless Fidelity) module 227 that transmits and receives a wireless signal that conforms to the Wi-Fi (registered trademark) standard, a Bluetooth (registered trademark) module 228 that transmits and receives a wireless signal that conforms to the Bluetooth (registered trademark) standard which is one of near-field communication standards, and an aerial tactile feel module 229 that gives an artificial tactile feel to a portion of a body that is not in contact with an object.

In the case of the present exemplary embodiment, a surface provided with the camera 225 and a surface provided with the liquid crystal display 223 are a front surface and a back surface, respectively.

This enables the user to capture an image of an object (e.g. the image forming apparatus) that is present in the real space and a part (e.g. a finger, a hand, or a foot) of his/her own body using the camera 225 while confirming the image on the liquid crystal display 223.

In the case where a plurality of cameras 225 are provided or in the case where a plurality of liquid crystal displays 223 are provided, it is only necessary that at least a set of a camera 225 and a liquid crystal display 223 should be disposed on the front surface and the back surface, respectively.

In the present embodiment, the liquid crystal display 223 is used. However, a different display unit such as an organic electro-luminescence (EL) display may also be used.

The aerial tactile feel module 229 according to the present embodiment includes an ultrasonic transducer array in which a plurality of ultrasonic transducers are arranged in a grid shape, for example. This type of the aerial tactile feel module 229 is capable of generating the focal point of ultrasonic waves at a desired position in the air. A tactile feel perceived by the users varied by adjusting the distribution of the focal points or the intensity of vibration.

For example, the generated tactile feel may be varied in accordance with the function as the operation target. A tactile feel is generated in the case where user motion is detected, in the case where an operation for a specific function is received, or the like, for example. Motion of a different user and the intensity of such motion may be transmitted through a tactile feel. The aerial tactile feel module 229 is an example of an application unit that applies a tactile feel.

The processing circuit section 210 includes a memory control section 211 that controls reading and writing of data from and into the memory 221, a plurality of central processing unit (CPU) cores that execute processing, a power source management section 213 that manages supply of power, a system management section 214 that manages operation of a built-in system, an audio processing section 215 that processes an audio signal, a graphics processing unit (GPU) 216 that processes an image in real time, a display control section 217 that displays an image on the liquid crystal display 223, an external interface (I/F) 218 that is used for connection with an external module, and a baseband circuit 219 that processes a baseband signal.

Figure 4:
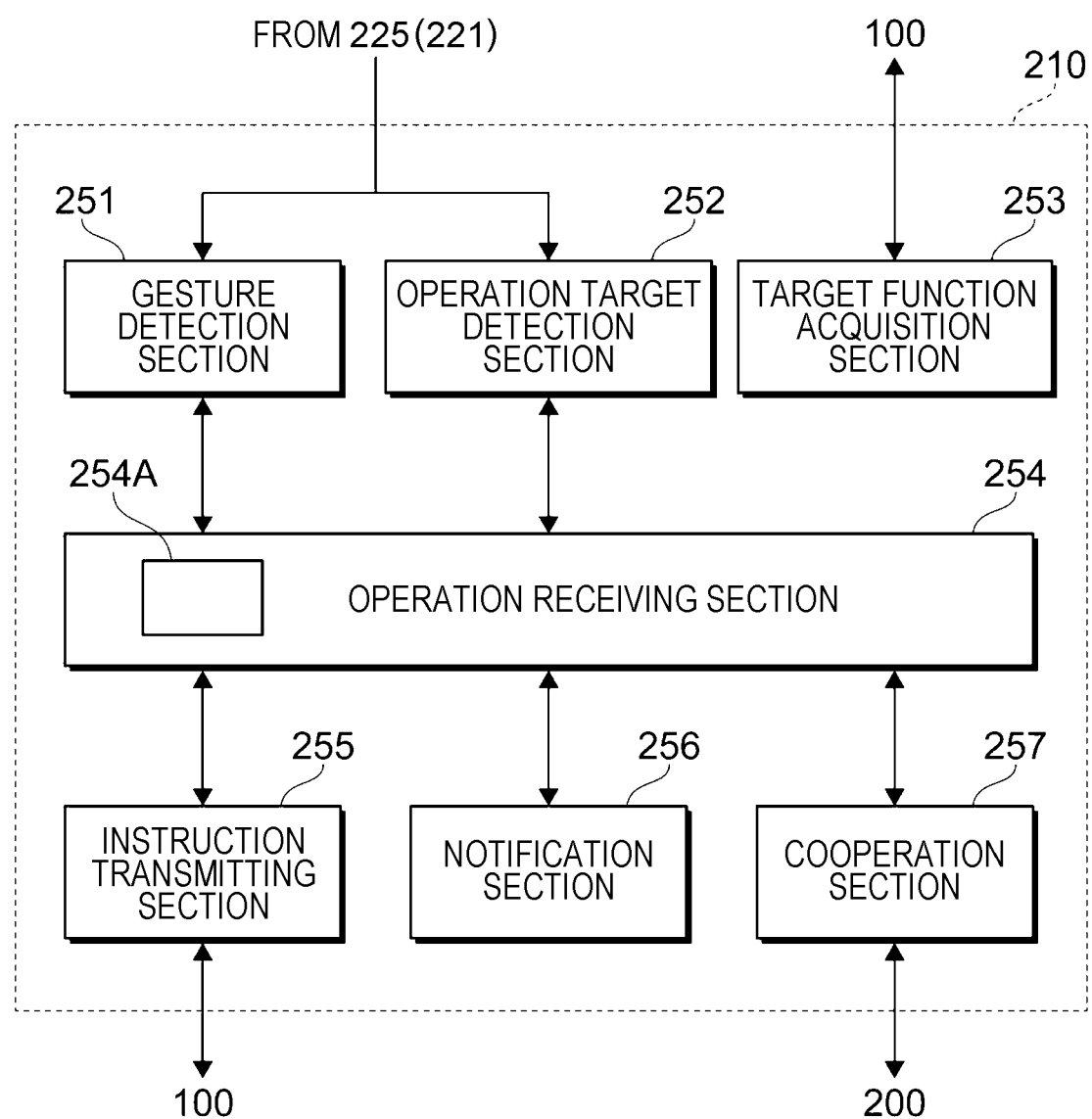
FIG. 4 illustrates an example of the functional configuration implemented by a processing circuit section through execution of a program.

FIG. 4 illustrates an example of the functional configuration implemented by the processing circuit section 210 through execution of a program.

The processing circuit section 210 here is an example of the detection unit, and is also an example of the control unit.

The processing circuit section 210 functions as a gesture detection section 251 that detects a gesture by the user by processing image data, an operation target detection section 252 that detects an operation target object, a target function acquisition section 253 that acquires information on a function of the object from the operation target object (the image forming apparatus 100 in the present embodiment), an operation receiving section 254 that receives a gesture by the user as an operation, an instruction transmitting section 255 that transmits an instruction corresponding to the received operation to the target object, a notification section 256 that notifies the user of reception of the operation, and a cooperation section 257 that cooperates with an operation by a different user for an identical (common) object.

The gesture detection section 251 according to the present embodiment detects motion of a part (e.g. a finger, a hand, or a foot) of the body of the user as a gesture from an image captured by the camera 225, for example. The meaning of motion differs for each object detected as the operation target. Even the meaning of motion for the same object differs among different functions as the operation target.

Examples of the gesture according to the present embodiment include pushing, pulling, rotating, grasping, kicking, stepping on, clicking, double-clicking, dragging, tapping, flicking, and swiping. The gesture may be specified using a deep learning function.

A different method may be employed to detect a gesture. For example, a gesture may be detected by a Time-of-Flight (ToF) method in which the distance to an object is calculated by measuring the time until semiconductor laser or light emitted from a light emitting diode (LED) is returned after being reflected by the object for each pixel, a Structured Light (SL) chronological pattern projection method in which the distance to an object, onto which a vertical stripe pattern that is varied chronologically is projected, is calculated from variations in brightness that appear in pixels obtained by capturing images of the object, a method of calculating the distance to an object using ultrasonic waves or millimeter waves, etc., either singly or in combination thereof. The combination may include a technique of recognizing a gesture by processing captured images.

The operation target detection section 252 according to the present embodiment detects an object as the operation target, an operation element thereof, etc. by analyzing an image displayed on the liquid crystal display 223 (see FIG. 3).

Examples of the operation element according to the present embodiment include a physical structure (e.g. a button and a switch) to be operated and display (e.g. a button and a switch) on a screen reproduced in a software manner.

The image that is used in the processing is not limited to real-time image data acquired from the camera 225 provided to the smartphone 200, and may be mage data acquired from the memory 221 or acquired externally.

In the case where a plurality of objects are included in the screen, the operation target detection section 252 may detect an object, an image of which displayed on the liquid crystal display 223 is closer to the center of the screen, as the target, or may detect an object, an image of which is superposed on an image of a part of the body of the user, as the operation target, for example.

The operation target detection section 252 may detect a device selected by the user from a list of devices being connected with the smartphone 200 through a wireless LAN or the like as the operation target.

The target function acquisition section 253 according to the present embodiment acquires information on an operation element that is operable through communication with an object detected by the operation target detection section 252, for example. For example, the target function acquisition section 253 acquires information on an operation element using a wireless LAN.

The target function acquisition section 253 may also acquire information on an operation element that is operable from each of communicable devices, for example.

The operation target is not limited to an object that has a communication function. Examples of such an operation target include a plant and a natural object. Also in this case, the target function acquisition section 253 may acquire information on an operation that is executable through communication with a different device such as a robot that is capable of making motion on behalf of a person.

The operation receiving section 254 according to the present embodiment receives the gesture which is detected by the gesture detection section 251 as an operation for a specific function of the object which is detected by the operation target detection section 252.

The operation receiving section 254 receives an operation with reference to a table 254A prepared for each object, for example. The table 254A may be prepared for each function. In the case of FIG. 4, the table 254A is stored in the operation receiving section 254. The table 254A may be stored in the memory 221 (see FIG. 3) which is connected to the processing circuit section 210.

FIG. 5 illustrates an example of a table 254A1 provided to operate the image forming apparatus 100 (see FIG. 1).

The table 254A1 stores the relationship between operations assumed for the image forming apparatus 100 and individual users.

The content of the table 254A1 may be registered or corrected by an authorized user or manager.

The assumed operations are not limited to functions that the image forming apparatus 100 as the operation target has or functions that are executable by the image forming apparatus 100. The operations may include an operation to move the image forming apparatus 100 by applying an external force and an operation to open and close a movable portion such as a lid or a drawer, for example.

In the case of the present embodiment, the table 254A1 stores, for each user, for example, whether or not the user is permitted to execute a specific operation, whether or not cooperation with a different user is required, the content of an operation required in the case where such cooperation is required, etc.

Examples of an operation that requires cooperation with a different user include an operation required to be executed at the same timing, an operation required to be executed temporally successively, and an operation that is one of a plurality of elements obtained by decomposing one operation. In the case where an operation is required to be executed temporally successively, it is necessary that an operation by a cooperating user should be executed within a time determined in advance.

The different user is not limited to one user, and may be a plurality of users.

The order of execution by a plurality of users required to cooperate with each other may be prescribed, although such an order not prescribed in the table 254A1. In case where the order of execution is prescribed, the operation receiving section 254 (see FIG. 4) does not instruct execution of an operation unless the users execute the operation in the prescribed order.

In the case of FIG. 5, for example, a user A is able to perform an operation for functions related to printing and facsimile transmission alone, but is not able to perform an operation for functions related to changing the color tint for printing (printing color tint) etc.

A user B is able to perform an operation for functions related to printing, facsimile transmission, changing the printing color tint, and authentication alone, but requires authentication by a user D to perform an operation for functions related to changing the address book and tone correction, for example.

A user C requires authentication by the user B to perform an operation for functions related to printing, facsimile transmission, and changing the printing color tint, and requires authentication by the user D to perform an operation for functions related to changing the address book and tone correction, for example. The user C is not able to perform an operation for a function related to authentication.

The user D is able to perform an operation for functions related to printing, changing the address book, tone correction, and authentication alone, but requires input of an area code by the user A to perform an operation for a function related to facsimile transmission, and requires authentication by the user B to perform an operation for a function related to changing the printing color tint, for example.

While four users are given in the example in big the number of users is not limited to four. The operations are also not limited to the six types given in FIG. 5.

As indicated in FIG. 5, if the combination of users is different, the allocation of operations required from the individual users is also different.

For example, the allocation of operations to the user B and the user C and the allocation of operations to the user B and the user D are different from each other.

In the example in FIG. 5, examples of the cooperation for an operation include an example in which one user enables the other user to perform an operation through authentication, and an example in which the users take part in inputting a number that specifies the destination of facsimile transmission. However, the users may take part in setting an item related to a function, for example.

FIG. 4 is described again.

The instruction transmitting section 255 according to the present embodiment transmits an instruction corresponding to the received operation to the target object (e.g. the image forming apparatus). In addition, the instruction transmitting section 255 has a function of acquiring a response to an instruction (e.g. reception of an instruction) from the target object.

The notification section 256 according to the present embodiment makes various kinds of notifications that assist in performing an operation by a gesture through the audio circuit 222 or the liquid crystal display 223.

The cooperation section 257 according to the present embodiment exchanges information on an operation with a smartphone 200 operated by a different user prescribed as a cooperation partner in the table 254A. The cooperation section 257 may also exchange information on an object as the operation target with a different smartphone 200 that is communicable with the cooperation section 257, even if such a smartphone 200 is not prescribed as a cooperation partner.

<Processing Operation Performed by Processing Circuit Section>

An example of processing operation executed by the processing circuit section 210 (see FIG. 4) will be described below with reference to FIGS. 6 and 7.

Figure 6:
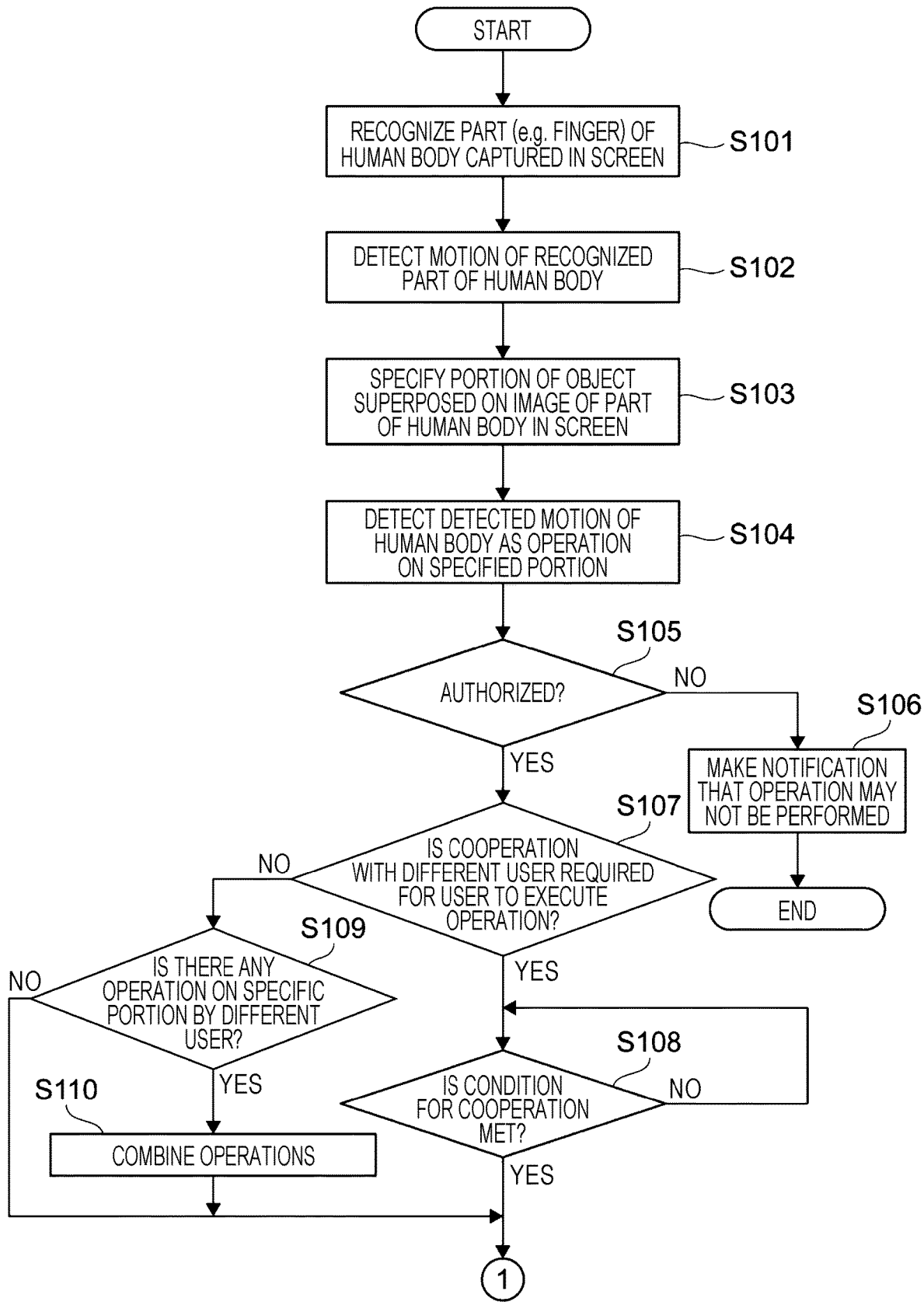
FIG. 6 is a flowchart illustrating a portion of an example of processing operation executed by the processing circuit section.

FIG. 6 is a flowchart illustrating a portion of an example of processing operation executed by the processing circuit section 210. In FIG. 6, steps are denoted by the symbol S. The same also applies to FIG. 7.

The processing circuit section 210 according to the present embodiment recognizes a part (e.g. a finger) of a human body that is captured in the screen of the liquid crystal display 223 (see FIG. 3) (step 101).

Next, the processing circuit section 210 detects motion of the recognized part of the human body (step 102).

The above processes are executed by the gesture detection section 251 (see FIG. 4), for example. As discussed earlier, a gesture may be detected not only through an image recognition process, but also using information (a so-called distance image) on a distance measured by a sensor.

After that, the processing circuit section 210 specifies a portion of an object superposed on an image of the part of the human body in the screen (step 103). This process is executed by the operation target detection section 252 (see FIG. 4), for example.

The processing circuit section 210 also recognizes an operation target object in advance or concurrently.

In the case where an operation target object may not be specified, the processing circuit section 210 makes a notification that an operation target object may not be specified, that an image that includes a model or the like should be captured, etc. This process is executed by the notification section 256 (see FIG. 4), for example.

Subsequently, the processing circuit section 210 detects the detected motion of the human body as an operation on the specified portion (step 104). This process is executed by the operation receiving section 254, for example.

In the case where no function is correlated with the specified portion or in the case where the detected motion is not related to execution of the correlated function, the processing circuit section 210 does not detect the detected motion as an operation.

Next, the processing circuit section 210 determines whether or not the user who is operating the smartphone 200 is authorized for the detected operation (step 105).

In the case where a negative result is obtained in step 105, the processing circuit section 210 makes a notification that the operation may not be performed (step 106), and ends the process. The notification is executed by the notification section 256, for example.

In the case where a positive result is obtained in step 105, the processing circuit section 210 determines whether or not execution of the detected operation by the user requires cooperation with a different user (step 107). This process is executed by the operation receiving section 254 with reference to the table 254A (see FIG. 4).

In the case where a positive result is obtained in step 107, the processing circuit section 210 determines whether or not a condition for cooperation is met (step 108). This process is executed by the operation receiving section 254 with reference to the table 254A. The processing circuit section 210 repeatedly makes the determination until the condition is met (while a negative result is obtained in step 108). It should be noted, however, that in the case where the condition is not met even when a time determined in advance elapses, a notification of the content of an operation that requires cooperation may be made, a notification may be sent to the smartphone 200 which is operated by a user, cooperation with whom is required, or a notification that an operation may not be performed may be made.

In the case where a negative result is obtained in step 107, on the other hand, the processing circuit section 210 determines whether or not there is any detected operation of the specific portion by a different user (step S109). This process is executed by the operation receiving section 254. This process is not always necessary, and may be used to synthesize an external force based on instructions from individual users in the case where a physical force acts on an object, for example.

In the case where a positive result is obtained in step 109, the processing circuit section 210 combines operations by a plurality of users (step 110). This process is executed by the operation receiving section 254. Combining of operations may be simple combining, or may be weighted combining.

Figure 7:
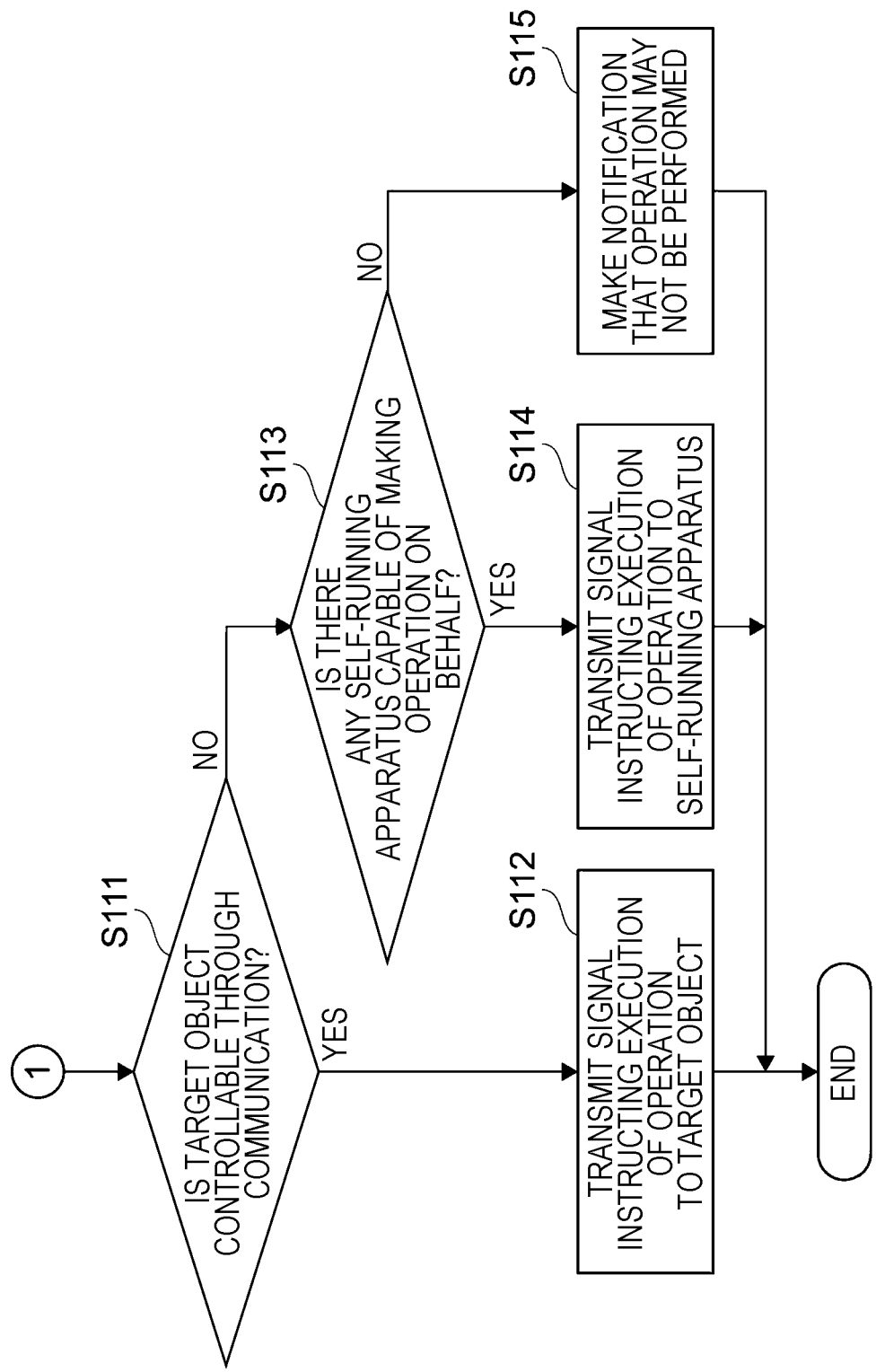
FIG. 7 is a flowchart illustrating the remaining portion of the example of processing operation executed by the processing circuit section.

In the case where a positive result is obtained in step 108, in the case where a negative result is obtained in step 109, or after execution of step 110, the processing circuit section 210 executes the process illustrated in FIG. 7.

FIG. 7 is a flowchart illustrating the remaining portion of the example of processing operation executed by the processing circuit section 210.

The processing circuit section 210 determines whether or not the target object is controllable through communication (step 111). This process is also executed by the operation receiving section 254, for example.

In the case where a positive result is obtained in step 111, the processing circuit section 210 transmits a signal that instructs execution of the operation to the target object (step 112).

In the case where a negative result is obtained in step 111, the processing circuit section 210 determines whether or not there is any self-running apparatus that is capable of making an operation on behalf (step 113). Examples of the self-running apparatus that is capable of making an operation on behalf include a robot.

In the case where a positive result is obtained in step 113, the processing circuit section 210 transmits a signal that instructs execution of the operation to the self-running apparatus (step 114).

In the case where a negative result is obtained in step 113, the processing circuit section 210 makes a notification that the operation may not be performed (step 115).

The processing circuit section 210 ends the process after such steps.

Operation Examples

Operation examples implemented using the functions discussed earlier will be described below.

Operation Example 1

Figure 8:
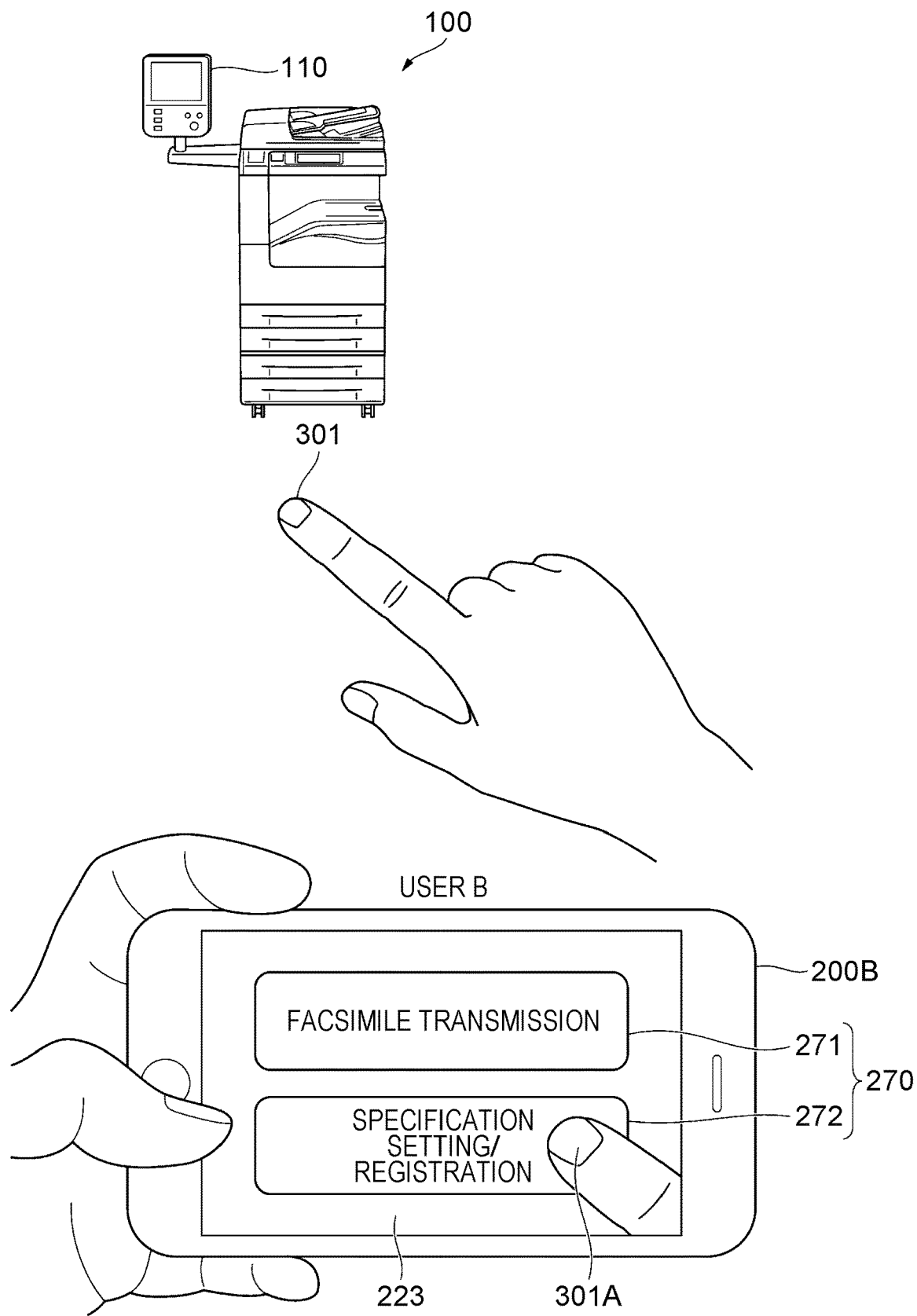
FIG. 8 illustrates a scene in which a user B as the image capturer captures an image of his/her own index finger as superposed on the image forming apparatus on a screen.

FIG. 8 illustrates a scene in which the user B as the image capturer captures an image of his/her own index finger 301 as superposed on the image forming apparatus 100 on the screen.

When capturing an image, the user B holds the smartphone 200B with his/her left hand. The index finger 301 is an index finger of the user B, and is not in contact with the image forming apparatus 100. Specifically, the index finger 301 is positioned in the air between the image forming apparatus 100 and the smartphone 200B.

In the case of FIG. 8, a portion of the user interface section 110 is displayed as enlarged on the liquid crystal display 223 of the smartphone 200B.

This display state is obtainable by moving two fingers in contact with the screen of the liquid crystal display 223 away from each other with an image of the image forming apparatus 100 displayed on the liquid crystal display 223. Display may be enlarged without contacting the liquid crystal display 223 if a voice recognition technique is used.

In the case of FIG. 8, an image 270 (a button 271 for facsimile transmission and a button 272 for specification setting/registration) in which a portion of the user interface section 110 that is present in the real space is captured and an index finger image 301A are displayed on the liquid crystal display 223. This screen is an example of an image for work.

In the case of the present embodiment, the printing color tint is changeable when an operation to click on the button 272 for specification setting/registration is received. In the case of the table 254A1 (see FIG. 5), the user B is able to perform an operation to change the printing color tint alone.

In the real space, as discussed earlier, the image forming apparatus 100, the index finger 301 of the user, and the smartphone 200B are positioned sequentially in this order from the farther side.

Thus, the index finger image 301A captured by the smartphone 200B is displayed as superposed on the closer side of the user interface section image 270.

To operate the image forming apparatus 100 using motion of the index finger 301, it is necessary that the image forming apparatus 100 should be specified in advance as the operation target.

To specify the image forming apparatus 100, it is possible to use a technique of specifying a model by processing an image of the image forming apparatus 100, a technique of detecting character information such as a model number included in an image, a technique of allowing selecting one from candidates displayed on the liquid crystal display 223, or the like, for example. The candidates are given as a list of devices being connected with the smartphone 200B through a wireless LAN or the like, for example.

It is assumed that the image forming apparatus 100 has already been specified as the operation target.

In the case of FIG. 8, two operation elements button 271 for facsimile transmission and the button 272 for specification setting/registration) that are operable are displayed on the liquid crystal display 223. However, three or more operation elements may be displayed, or only one operation element may be displayed.

In the case of FIG. 8, two operation elements are displayed on the liquid crystal display 223, and thus it is necessary to move the index finger 301 in the air such that the operation element as the operation target and the index finger image 301A are superposed on each other.

Movement of the index finger 301 in the air is also detected by the smartphone 200B as motion of the user. It should be noted, however, that motion in the horizontal direction is not correlated with motion of an operation on the operation element captured in an image.

Therefore, motion made before the index finger image 301A is superposed on the button 272 for specification setting/registration is not received as an operation on the operation element.

In the present embodiment, motion of the index finger image 301A is detected since the operation target includes buttons. However, a portion of the body as the detection target may be determined in accordance with the operation target. For example, a part of a human body such as a hand, an arm, or a foot may be determined as the detection target.

Figure 9:
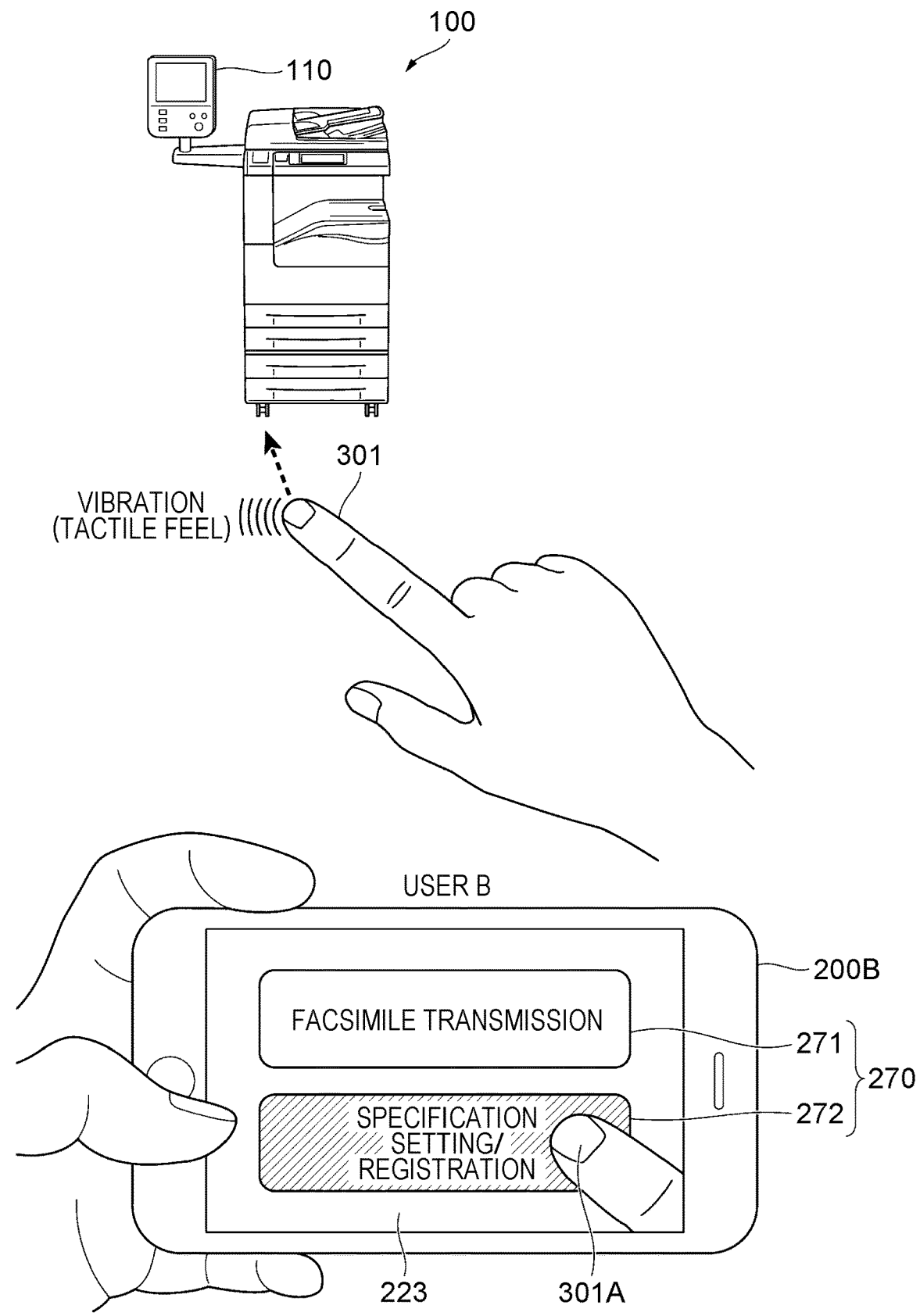
FIG. 9 illustrates a scene in which the user captures an image in which the user makes operation to move his/her index finger forward in the air without contacting the image forming apparatus.

FIG. 9 illustrates a scene in which the user captures an image in which the user performs operation to move his/her index finger 301 forward in the air without contacting the image forming apparatus 100. Portions in FIG. 9 corresponding to those in FIG. 8 are denoted by the corresponding reference numerals.

The pushing operation here refers to motion in the direction in which the index finger 301 is moved away from the smartphone 200B. In other words, the pushing operation refers to motion toward the image forming apparatus 100.

Specifically, the pushing operation corresponds to motion to push an operation element displayed on the user interface section 110 in the actual space. This is because the direction of the line of sight of the user and the direction in which the camera 225 (see FIG. 3) captures an image coincide with each other.

The index finger image 301A is superposed on the button 272 for specification setting/registration on the liquid crystal display 223 illustrated in FIG. 9, and thus the smartphone 200B detects the pushing operation as an operation to push the button 272 for specification setting/registration.

In the case of the present embodiment, the smartphone 200B stores the relationship between the operation elements and motion in the memory 221 (see FIG. 3). The memory 221 may store the relationship between some of the operation elements provided to the image forming apparatus 100 and motion.

The relationship between images of the operation elements provided to the image forming apparatus 100 and motion recognized as operations may be stored in the image forming apparatus 100, and a process of specifying an operation element as the operation target may be executed by the image forming apparatus 100.

In FIG. 9, the smartphone 200B is able to communicate with the image forming apparatus 100, and thus transmits a signal that instructs operation of the button 272 for specification setting/registration to the image forming apparatus 100.

The smartphone 200B according to the present embodiment is prepared for a function of notifying the user of reception of an operation.

Therefore, in FIG. 9, the user is notified of reception of an operation by varying the manner of display of the button 272 for specification setting/registration.

Examples of the method of varying the manner of display include increasing the brightness of a region in which the button as the operation target is displayed, flashing the region, and varying the region to a different color.

In FIG. 9, vibration is applied to the index finger 301 by ultrasonic waves concentrated on the surface of the index finger 301. The ultrasonic waves are output from the aerial tactile feel module 229 (see FIG. 3). The vibration gives the user B a tactile feel that the operation of the button has been received. When the tactile feel is given, the user is informed that his/her own motion has been received as an operation.

The aerial tactile feel module 229 may be provided to the image forming apparatus 100. In this case, the aerial tactile feel module 229 may give a tactile feel to the ball of the index finger 301 which is directed toward the image forming apparatus 100.

The aerial tactile feel module 229 may be disposed in a space as an independent apparatus.

Operation Example 2

Figure 10:
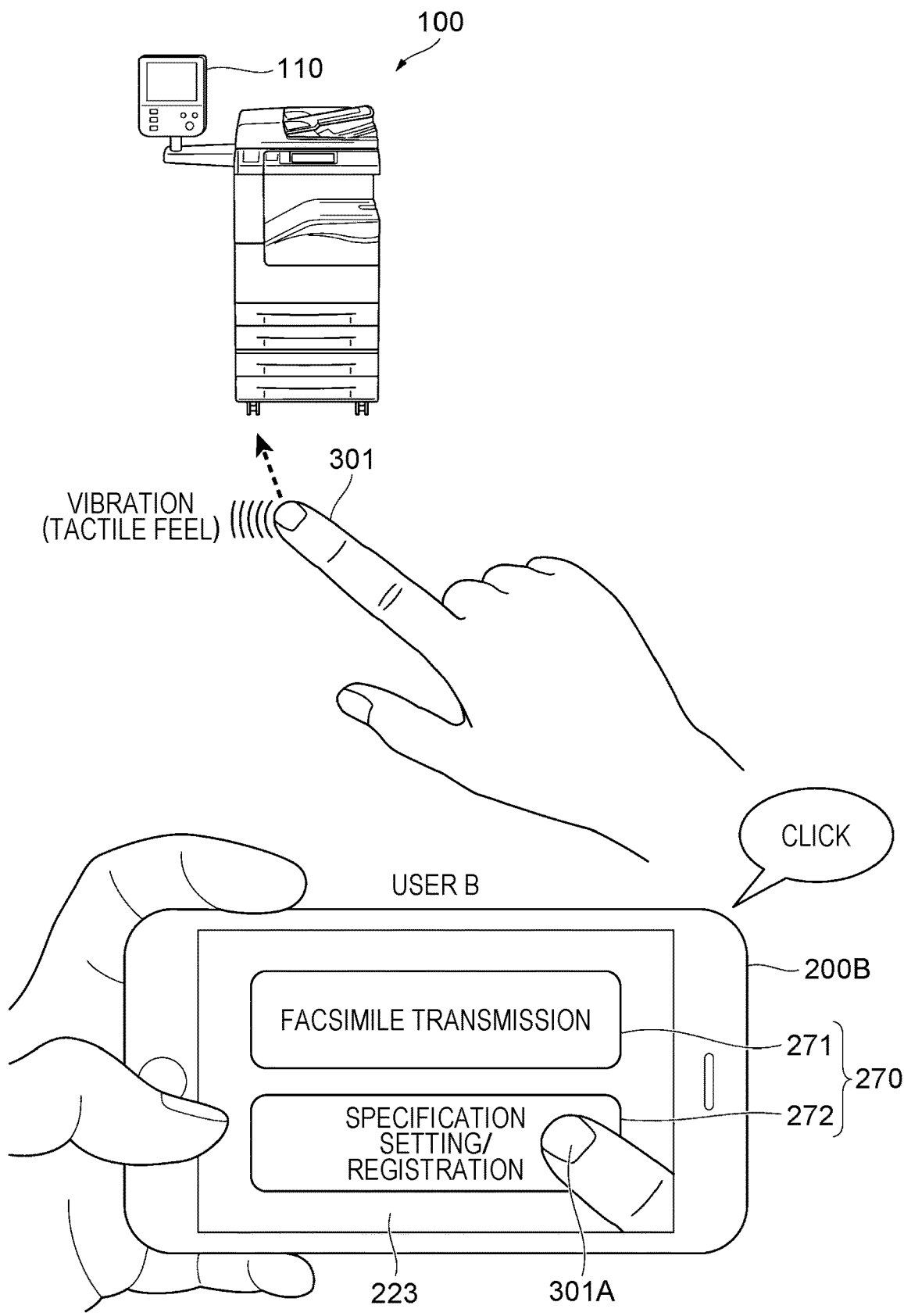
FIG. 10 illustrates a different method of notifying the user of reception of an operation.

FIG. 10 illustrates a different method of notifying the user of reception of an operation.

Portions in FIG. 10 corresponding to those in FIG. 9 are denoted by the corresponding reference numerals.

In the case of FIG. 10, a "click" sound is output from a speaker (not illustrated) although display of the button 272 for specification setting/registration is not varied.

A speech such as "Operation has been received" may be generated in the notification method which uses a sound.

Operation Example 3

Figure 11:
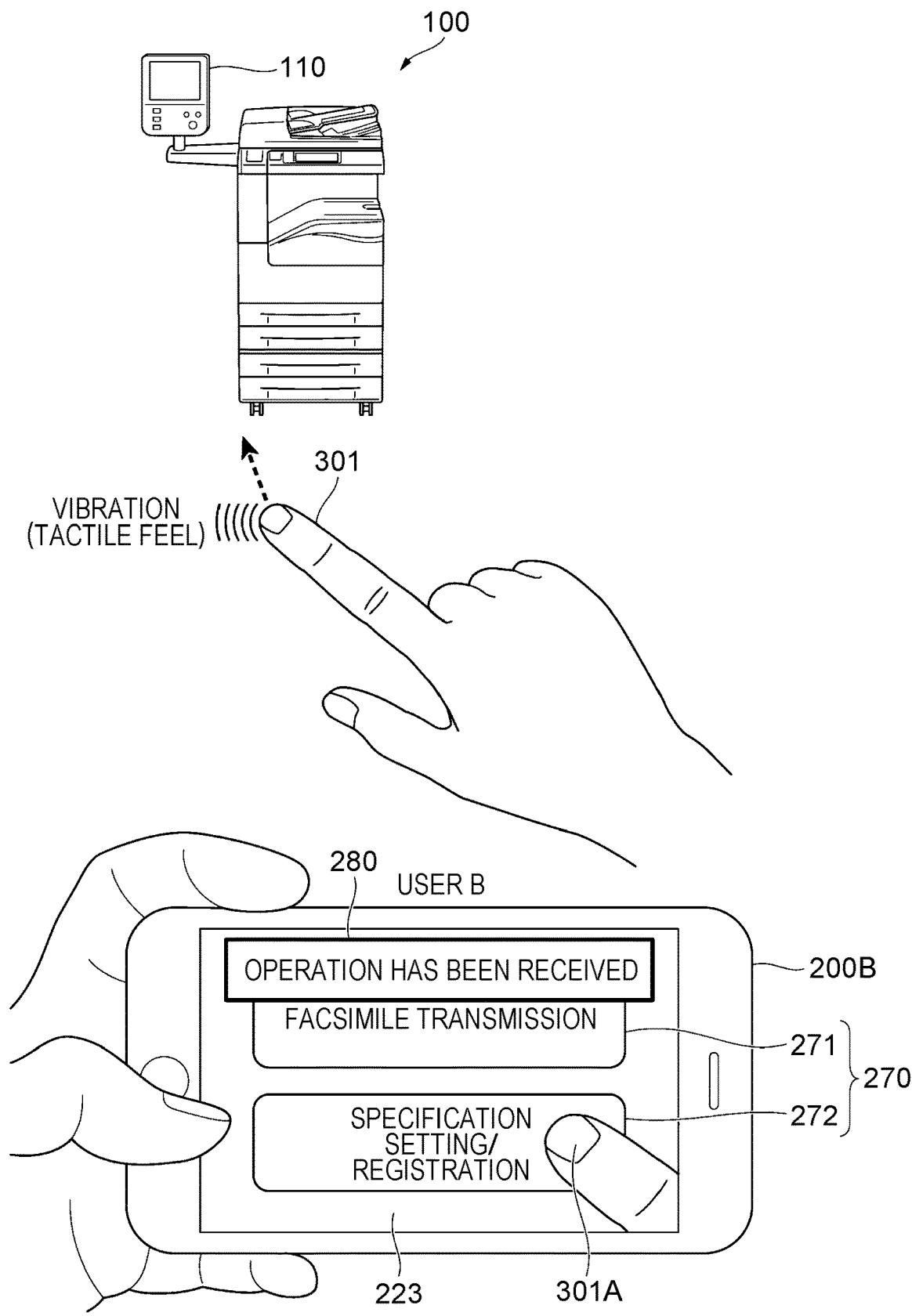
FIG. 11 illustrates a different method of notifying the user of reception of an operation.

FIG. 11 illustrates a different method of notifying the user of reception of an operation.

Portions in FIG. 11 corresponding to those in FIG. 9 are denoted by the corresponding reference numerals.

In the case of FIG. 11, a small screen 280 that indicates reception of an operation is additionally displayed although display of the button 272 for specification setting/registration is not varied.

A character string "Operation has been received" is written in the screen 280 illustrated in FIG. 11. As a matter of course, this character string is exemplary.

Operation Example 4

Figure 12:
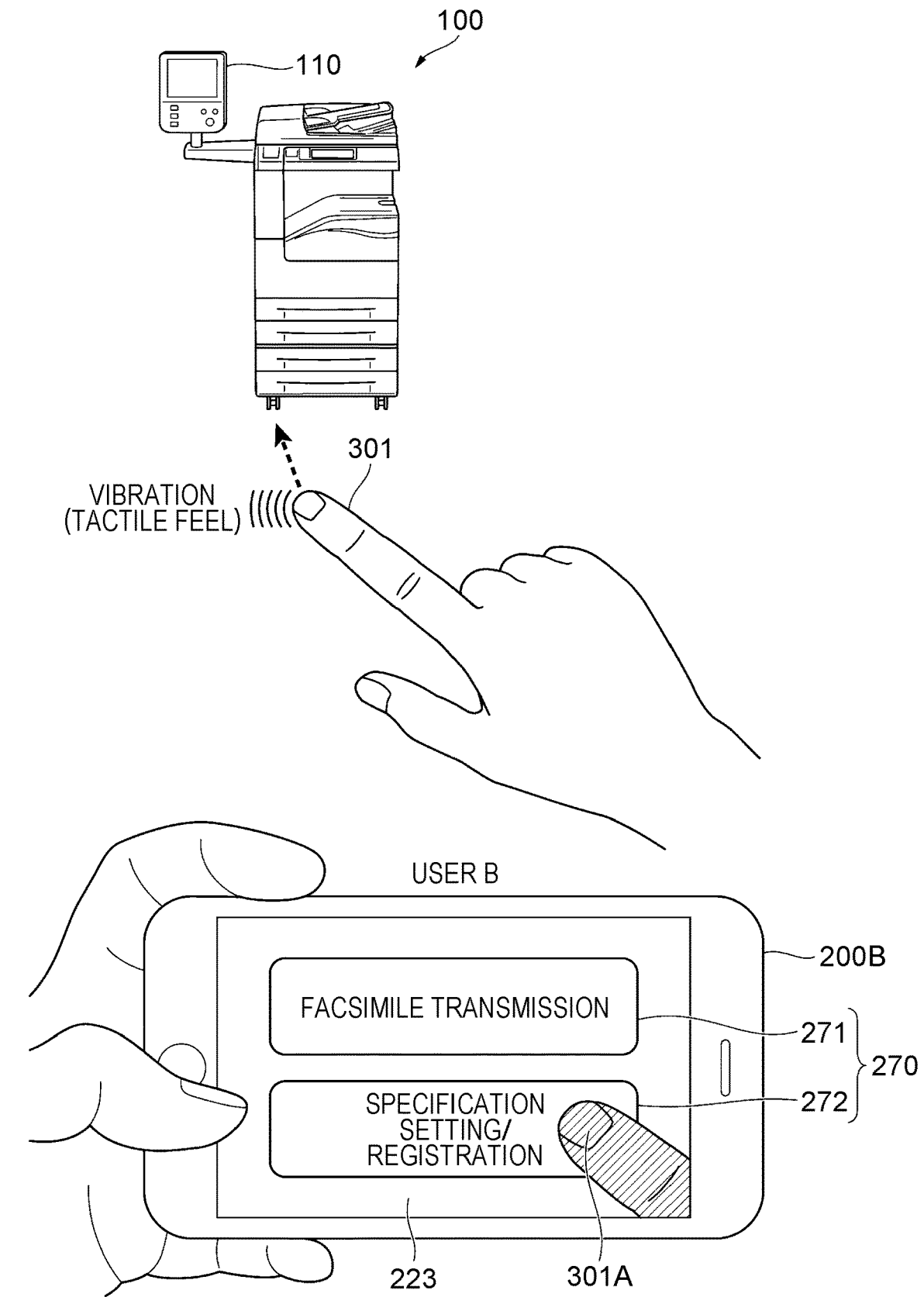
FIG. 12 illustrates a different method of notifying the user of reception of an operation.

FIG. 12 illustrates a different method of notifying the user of reception of an operation.

Portions in FIG. 12 corresponding to those in FIG. 9 are denoted by the corresponding reference numerals.

In the case of FIG. 12, the manner of display of the index finger image 301A has been varied from the manner before reception of an operation although display of the button 272 for specification setting/registration is not varied.

Examples of the method of varying the manner of display include increasing the brightness of a region in which the index finger image 301A is displayed, flashing the region, and varying the region to a different color.

Operation Example 5

Figure 13:
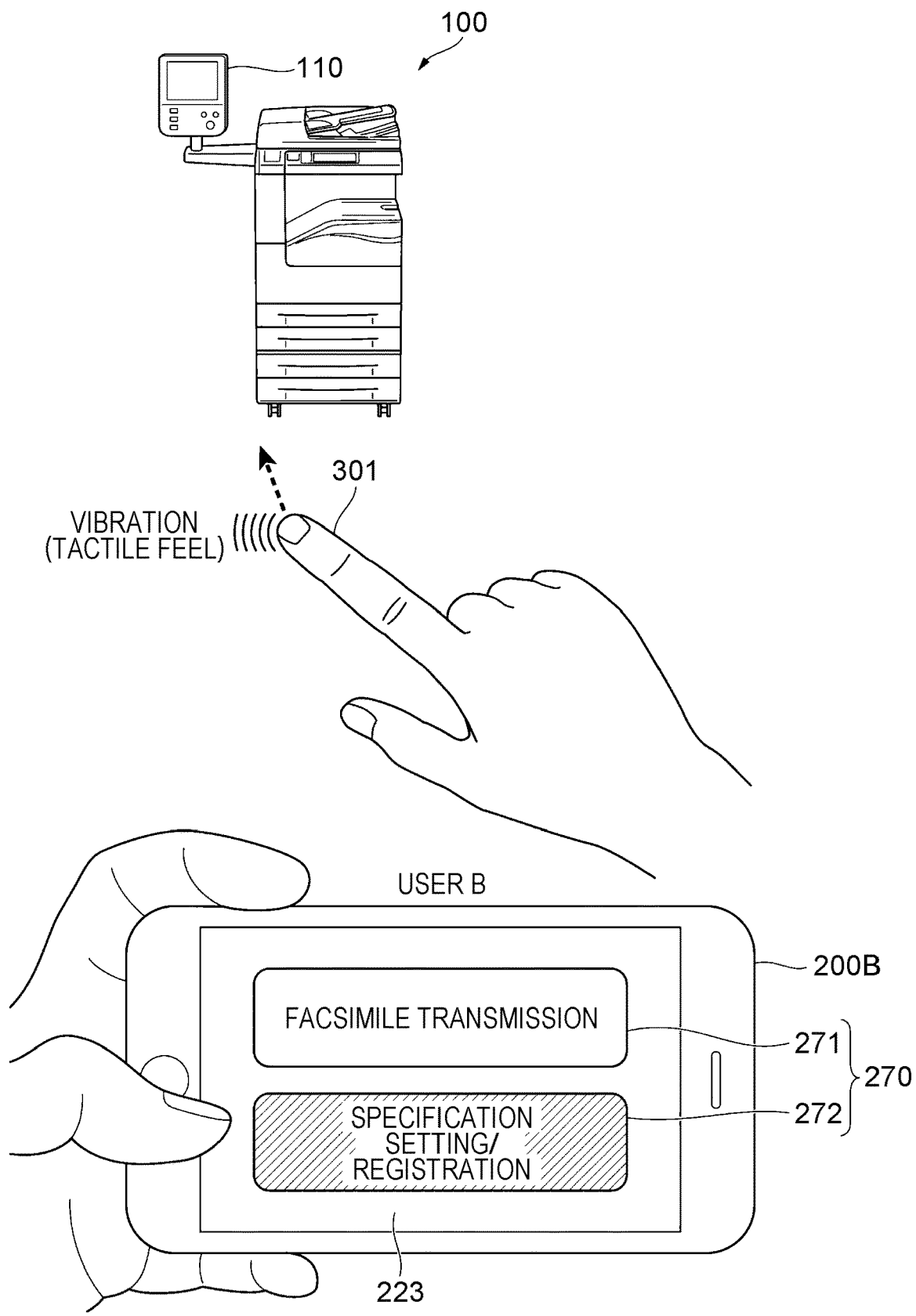
FIG. 13 illustrates a method in which an index finger image is not displayed on a liquid crystal display.

FIG. 13 illustrates a method in the index finger image 301A (see FIG. 9) is not displayed on the liquid crystal display 223.

Portions in FIG. 13 corresponding to those in FIG. 9 are denoted by the corresponding reference numerals.

In the method in which a part of a human body that has entered the range of an image captured by the camera 225 (see FIG. 3) is always displayed, for example, a large portion of an operation element may be hidden by the part of the human body. For example, characters written on the operation element may be hidden by an image of a hand or an arm.

In such a case, the user may not be able to confirm the operation element as the operation target on the screen, or may be able to confirm only a part thereof, which may hinder an operation.

If characters written on an operation element may not be confirmed, the user may not be able to see what operation element he/she is operating, and may perform an erroneous operation.

Thus, in FIG. 13, the manner of display of an operation element (the button 272 for specification setting/registration) at a position superposed by the index finger image 301A is varied to assist confirmation by the user, Operation Example 6

Figure 14:
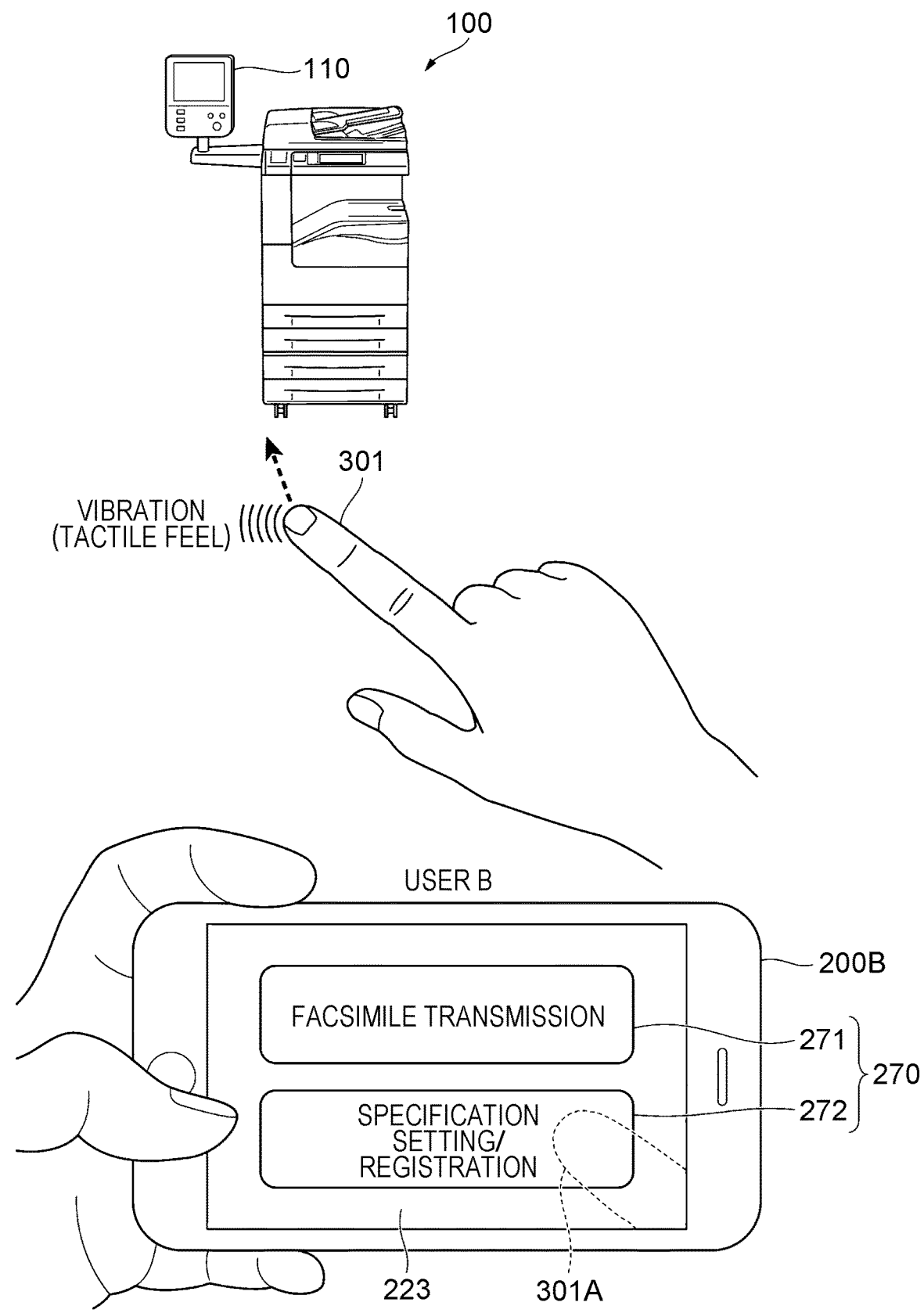
FIG. 14 illustrates a different method in which an index finger image is displayed on the liquid crystal display.

FIG. 14 illustrates a different method in which the index finger image 301A is displayed on the liquid crystal display 223.

Portions in FIG. 14 corresponding to those in FIG. 11 are denoted by the corresponding reference numerals.

While the index finger image 301A is not displayed at all in Operation Example 5, it is also conceivable that there is a request to confirm a position on the screen.

Operation Example 6 provides a display method provided in consideration of such a request, and provides the contour line of a region in which the index finger image 301A is positioned. The contour line here is an example of the notation that suggests a portion of the body of the user.

In FIG. 14, the contour line of the index finger image 301A is indicated by the broken line. However, a transparent image obtained through image processing may be displayed in place of an actual image. The transparent image here is also an example of the notation that suggests a portion of the body of the user.

Only an index finger portion may be selectively displayed by a contour line or as a transparent image while other portions are displayed as an actual image. On the contrary, only an index finger portion may be selectively displayed as an actual image. The area which is hidden by an image of a part of a human body reduced, and thus an image of an object as the operation target may be confirmed easily.

Operation Example 7

While a button that is operable by the user B as the operator alone is operated in Operation Examples 1 to 6 discussed earlier, an operation that requires cooperation will be described below.

Figure 15:
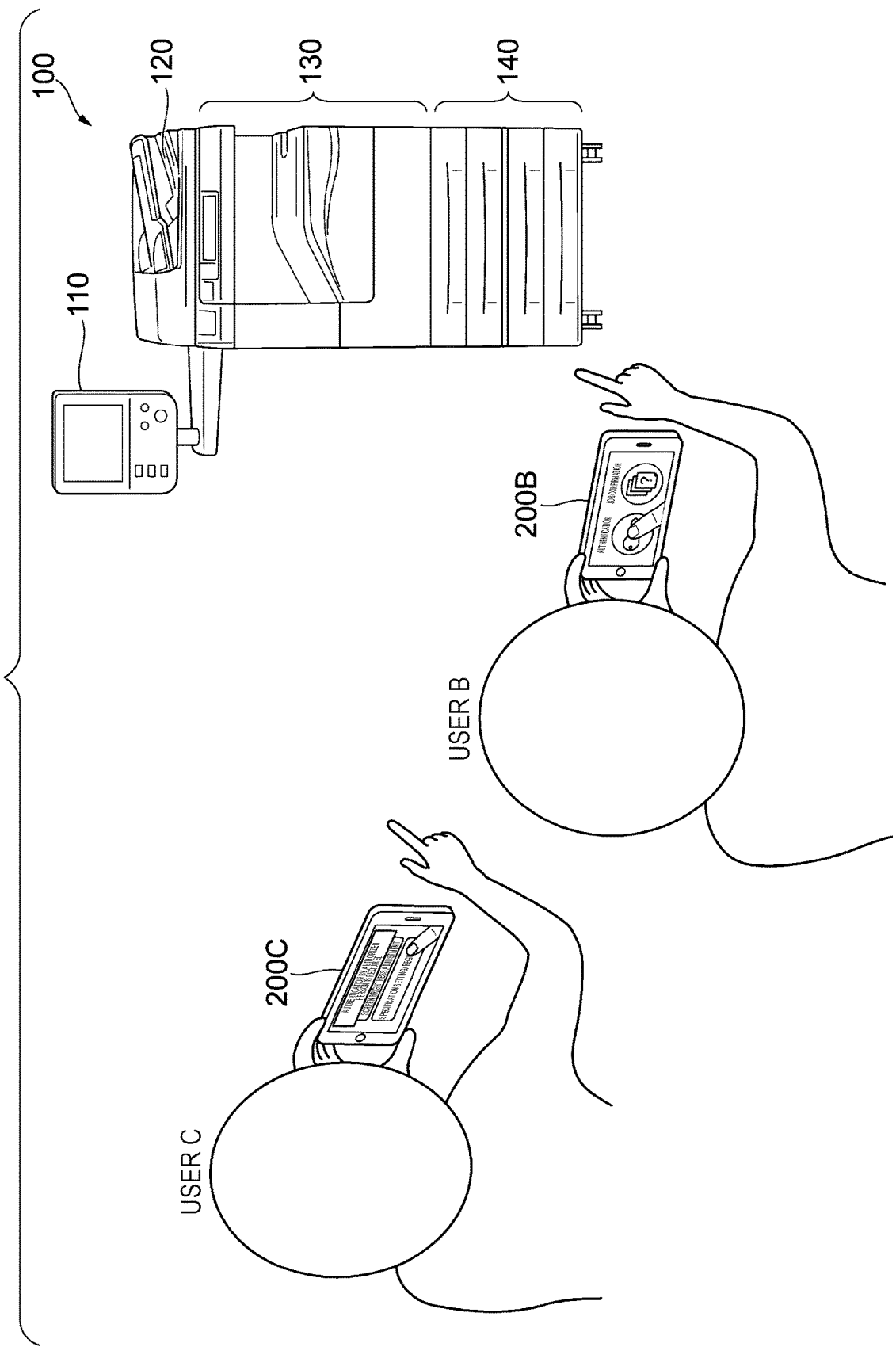
FIG. 15 illustrates an example of an operation performed through cooperation between the user B and a user C.

FIG. 15 illustrates an example of an operation performed through cooperation between the user B and the user C. Cooperation between an operation by the user C to change the printing color tint and an operation by the user B for authentication will be described in relation to this operation example.

Figure 16:
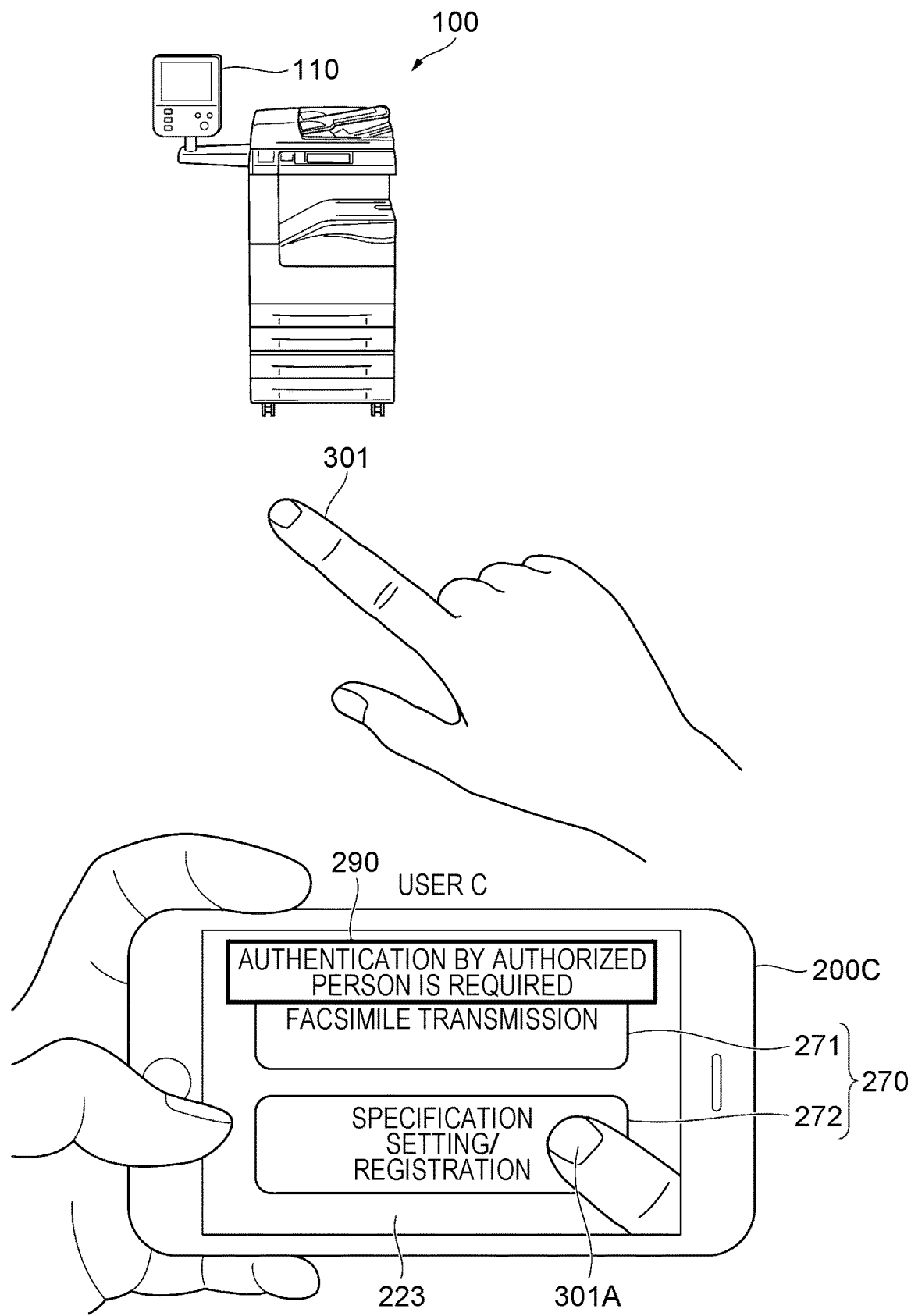
FIG. 16 illustrates a scene in which the user C who cooperates with the user B performs an operation.

FIG. 16 illustrates a scene in which the user C who cooperates with the user B performs an operation.

As in the operation examples discussed earlier, the index finger image 301A which is moved in the air between the image forming apparatus 100 and a smartphone 200C operated by the user C is displayed on the liquid crystal display 223 of the smartphone 200C.

In FIG. 16, the index finger image 301A is positioned on the button 272 for specification setting/registration. According to the table 254A1 (see FIG. 5), however, authentication by the user B is required for the user C to change the printing color tint.

Therefore, a small screen 290 that indicates that reception of an operation requires authentication by an authorized person is additionally displayed although display of the button 272 for specification setting/registration is not varied.

A character string "Authentication by authorized person is required" is written in the screen 290 illustrated in FIG. 16. As a matter of course, this character string is exemplary. The specific name of the authorized person may be indicated.

Figure 17:
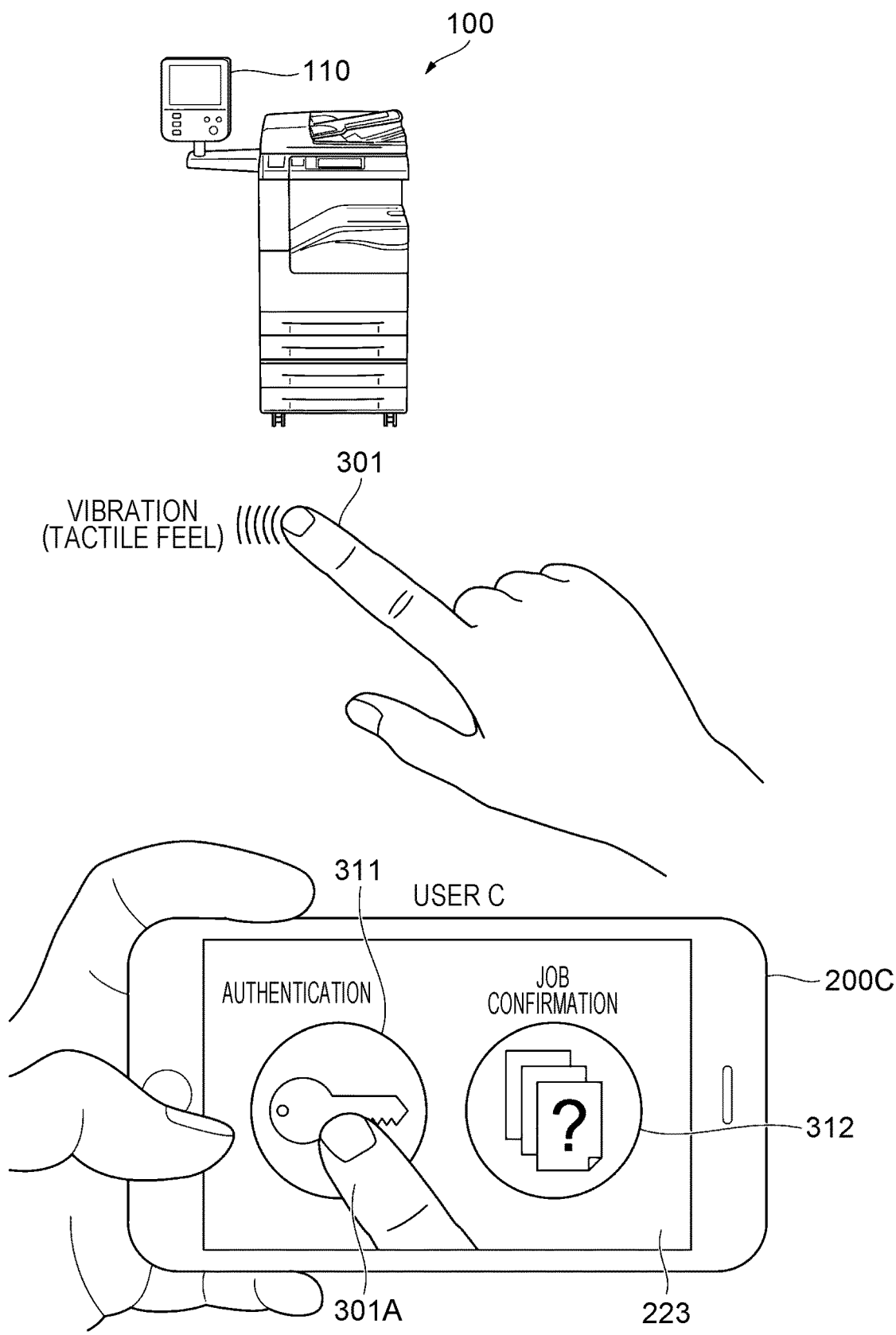
FIG. 17 illustrates a scene in which the user C who cooperates with the user B performs an operation.

FIG. 17 illustrates a scene in which the user B who cooperates with the user C performs an operation.

A button 311 for authentication and a button 312 for job confirmation are displayed on the liquid crystal display 223 of the smartphone 200B which is operated by the user B. As in the operation examples discussed earlier, the index finger image 301A which is moved in the air between the image forming apparatus 100 and the smartphone 200C is displayed on the liquid crystal display 223 of the smartphone 200C.

In the case of FIG. 17, the index finger image 301A is superposed on the button 311 for authentication. The user B is authorized to operate the button 311 for authentication alone, and thus an operation on the button 311 for authentication is received as a valid operation.

Figure 18:
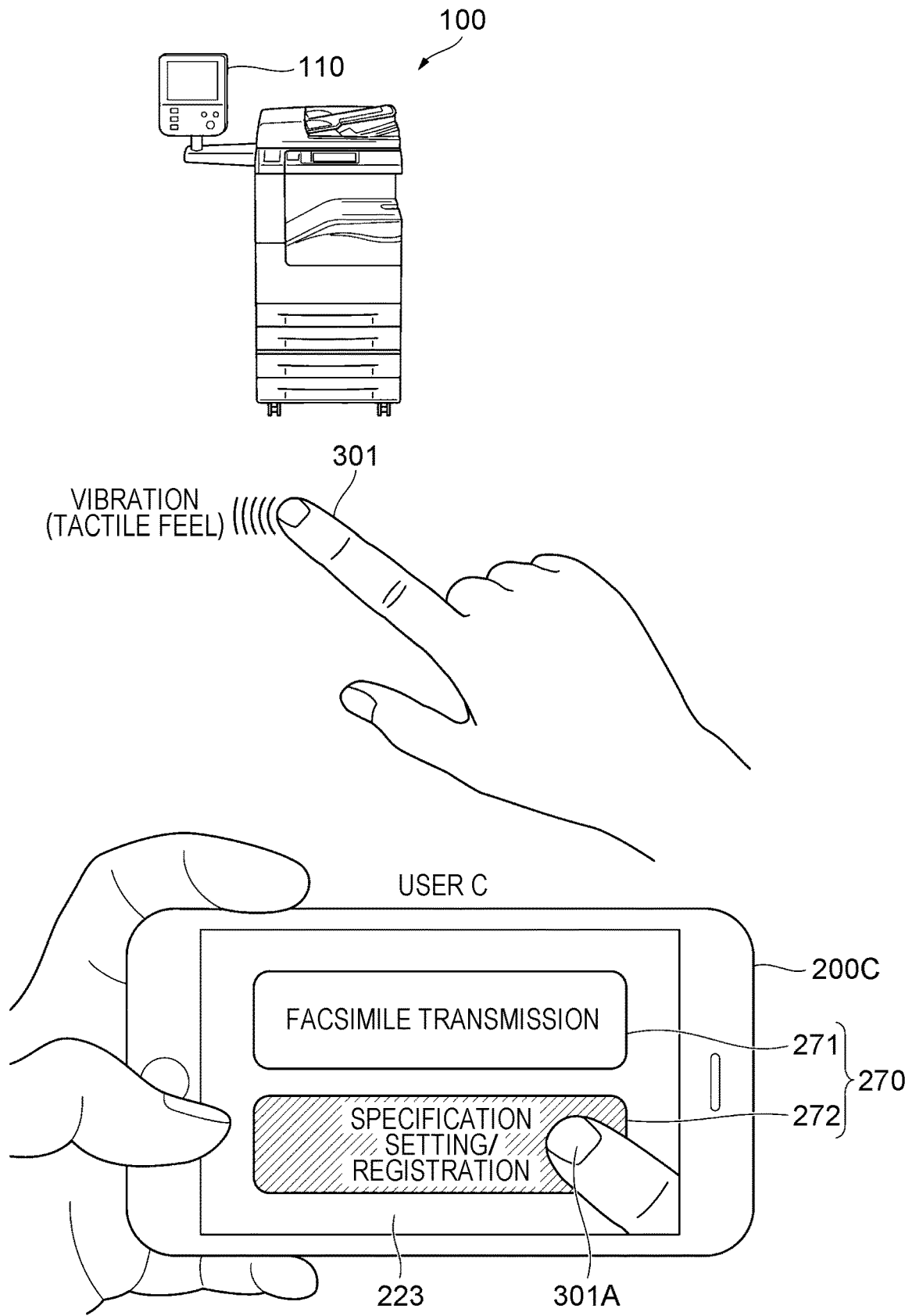
FIG. 18 illustrates variations that appear on the screen of a smartphone operated by the user C after authentication by the user B is completed.

FIG. 18 illustrates variations that appear on the screen of the smartphone 200C which is operated by the user C after authentication by the user B is completed.

The screen 290 (see FIG. 16) has disappeared from the screen illustrated in FIG. 18, and a notification that an operation by the user C has been received as being valid is made through variations in the manner of display of the button 272 for specification setting/registration and application of a tactile feel to the index finger 301.

After that, the user C executes the work of changing the printing color tint through a screen that is used for operation and displayed anew.

Second Exemplary Embodiment

In the exemplary embodiment discussed earlier, the operation target is the image forming apparatus 100 (see FIG. 1). In the present embodiment, however, the operation target is a door that opens and closes about a hinged portion.

Figure 19:
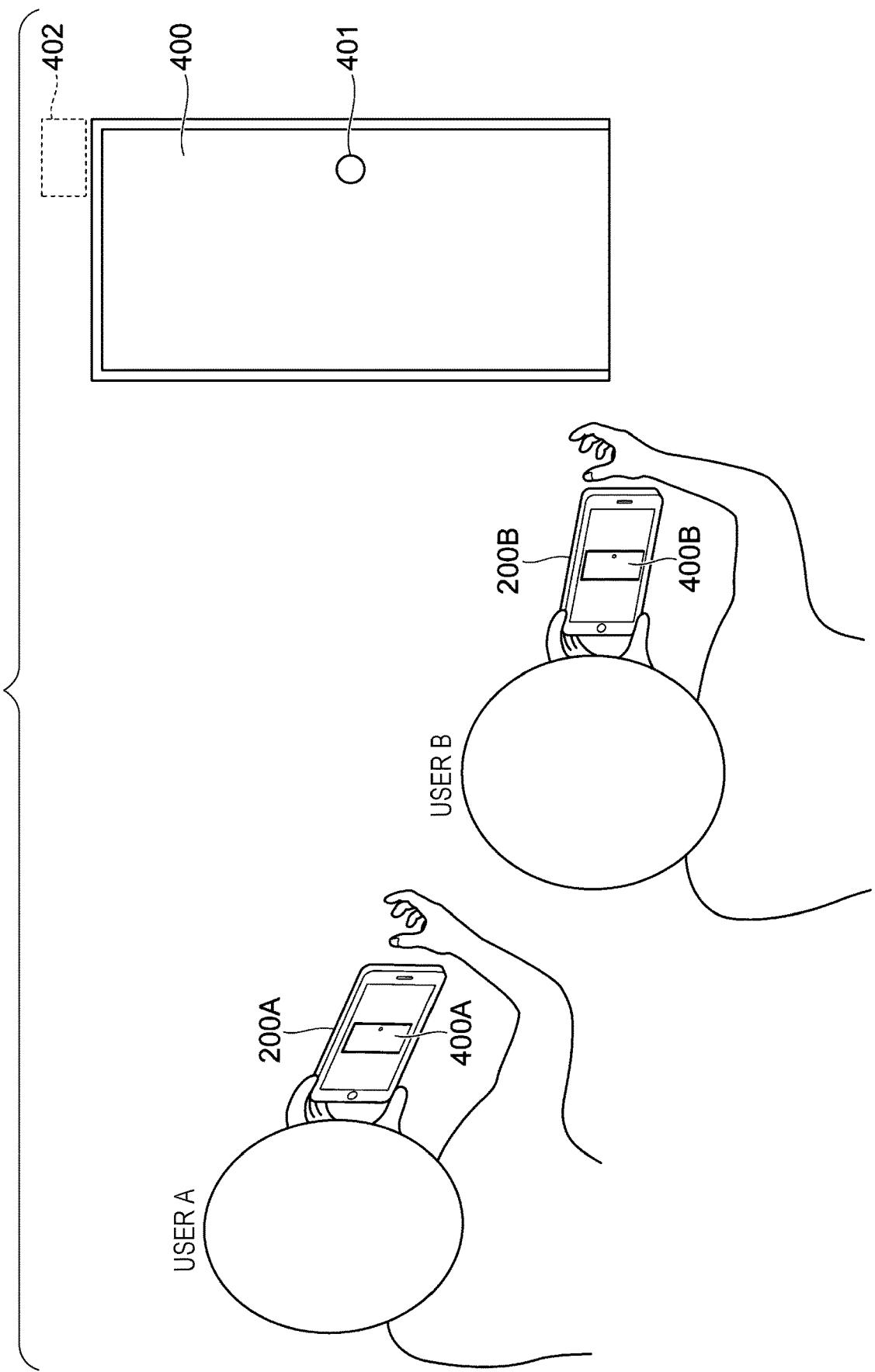
FIG. 19 illustrates an example of a system according to a second exemplary embodiment.

FIG. 19 illustrates an example of a system according to a second exemplary embodiment.

Portions in FIG. 19 corresponding to those in FIG. 1 are denoted by the corresponding reference numerals.

The system illustrated in FIG. 19 includes a door 400 and two smartphones 200A and 200B that capture an image of the door 400.

The door 400 is an example of an object that is present in the real space as the operation target.

The door 400 according to the present embodiment is provided with an electronic lock (not illustrated), a knob 401, and a drive mechanism 402 that drives to open and close the door 400 through communication with the smartphone 200 (in FIG. 19, the smartphones 200A and 200B).

In FIG. 19, the subject to be imaged is the door 400, and therefore the smartphones 200 display a door image 400A.

In the case of the present embodiment, the operation receiving section 254 (see FIG. 4) of the smartphone 200 receives an operation by a gesture of a user with reference to a table 254A2 (see FIG. 20) stored to operate the door 400.

FIG. 20 illustrates an example of the table 254A2 which is used to operate the door 400 (see FIG. 19).

The table 254A2 stores the relationship between operations assumed for the door 400 and individual users.

The content of the table 254A2 may also be registered or corrected by an authorized user or manager.

In the case of the present embodiment, the table 254A2 stores, for each user, for example, whether or not the user is permitted to execute a specific operation, whether or not cooperation with a different user is required, the content of an operation required in the case where such cooperation is required, etc.

In the case of FIG. 20, for example, the user A is able to perform an operation (opening operation) to open the door 400 and an operation (closing operation) to close the door 400, but is not authorized to lock and unlock the door 400.

Gestures by the user A for an opening operation and a closing operation are detected with a sensitivity of unity magnification.

A sensitivity of unity magnification means that the weighting factor is 1.0.

The strength of the force is unknown, and thus the sensitivity is provided in accordance with the direction of an operation by a gesture, the speed of the operation, the distance over which a portion (e.g. the right hand) of the body used in the operation is moved, etc.

The opening operation and the closing operation by the user A may be performed alone or through cooperation with a different user.

For example, the user B is able to perform an operation (opening operation) to open the door 400 with the sensitivity multiplied by 1.5. The sensitivity being multiplied by 1.5 means that the weighing factor is 1.5.

The user B is also able to perform an operation (closing operation) to close the door 400 with the sensitivity multiplied by two. The user is authorized to lock and unlock the door 400.

For example, the user C is able to perform an operation (opening operation) to open the door 400 with the sensitivity reduced to half.

On the other hand, the user C is not permitted to perform an operation (closing operation) to close the door 400. Meanwhile, the user C is able to lock and unlock the door 400 together with the user B. That the user C is not able to lock and unlock the door 400 alone.

While three users are given in the example in FIG. 20, the number of users is not limited to three. The operations are also not limited to the four types given in FIG. 20.

Operation Example 1

Figure 21:
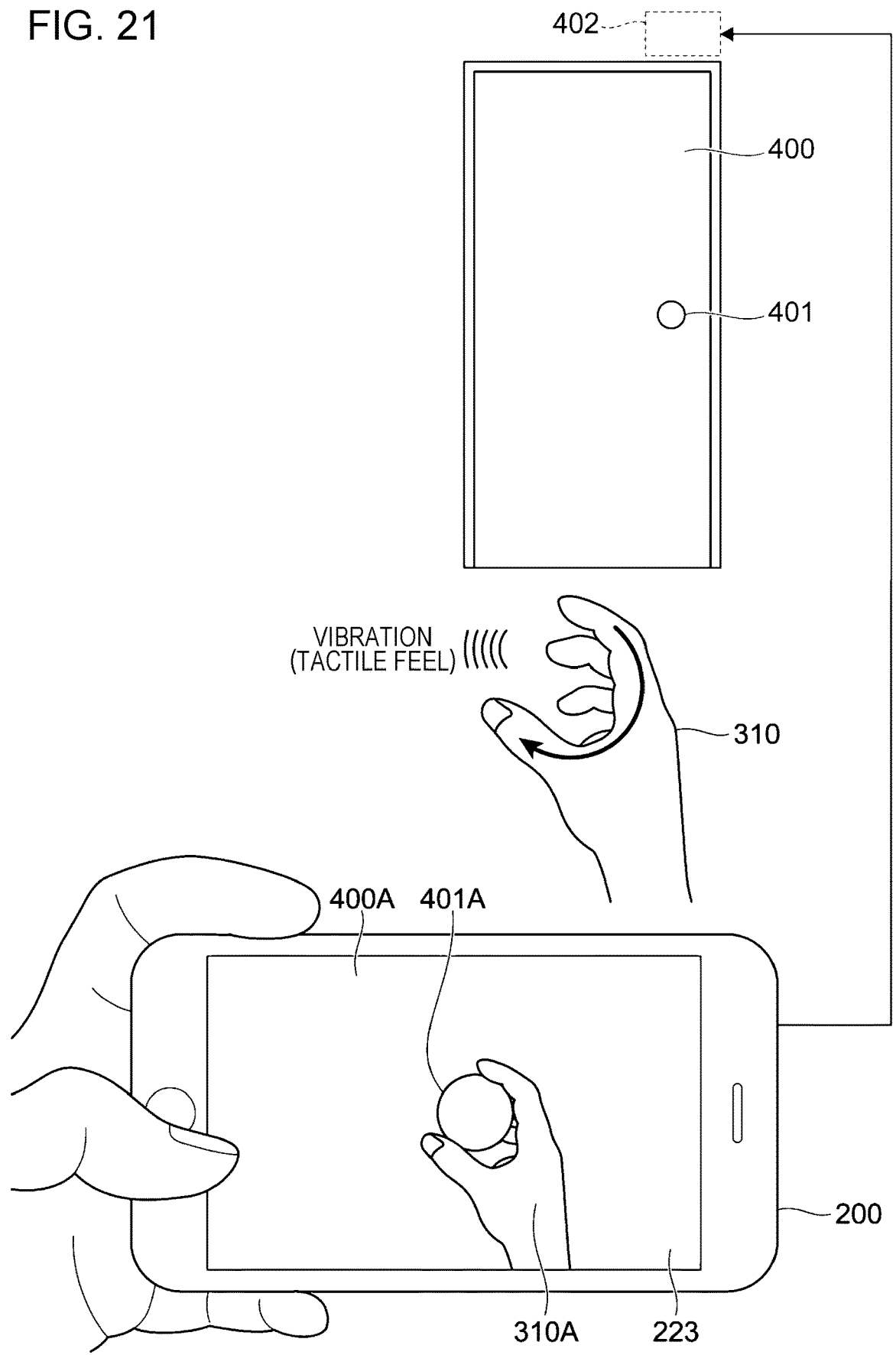
FIG. 21 illustrates a scene in which a user A or the user B as the operator captures an image of his/her own right hand as superposed on a knob image.

FIG. 21 illustrates a scene in which the user A or the user B as the operator captures an mage of his/her own right hand 310 as superposed on a knob image 401A.

In FIG. 21, the users are not differentiated from each other, and the smartphones are indicated as the smartphone 200.

Whether the image capturer is the user A or the user B, the image capturer captures an image of the door 400 while holding the smartphone 200 with his/her left hand as illustrated in FIG. 19. Therefore, the door image 400A and the knob image 401A are displayed on the liquid crystal display 223.

In the case of the present embodiment, the right hand 310 is positioned between the knob 401 of the door 400 and the smartphone 200. The right hand 310 is not in contact with the knob 401.

Therefore, a right hand image 310A is displayed on the liquid crystal display 223 as superposed on the door image 400A. In the case of FIG. 21, the right hand image 310A is an actual image.

In the case of FIG. 21, the right hand 310 is making motion as holding and turning the knob 401 in the air between the door 400 and the smartphone 200.

The door 400 illustrated in FIG. 21 opens toward the farther side when pushed, and closes when pulled toward the closer side.

Although the knob 401 is attached to the door 400 illustrated in FIG. 21, a lever-type handle (lever handle) may be attached to the door 400.

In the case of FIG. 21, a swinging door that opens and closes with a door surface drawing an arc is assumed. However, the door 400 may also be a sliding door guided by a groove or a rail to open and close linearly, a glide sliding door obtained by combining a swinging door and a sliding door, a folding door, a revolving door, etc.

The door 400 is not limited to a single-swing door, and may be a double-swing door.

Operation Example 2

FIGS. 22A and 22B illustrate an example of an operation for a case where the operator is the user A alone, with FIG. 22A illustrating a scene before an operation by a gesture and with FIG. 22B illustrating a scene after an operation by a gesture.

In the case of FIGS. 22A and 22b, the user A captures with the smartphone 200A an image of a gesture of pushing the door 400 open.

In the case of FIG. 20, an operation (opening operation) by the user A to open the door 400 is permitted. Therefore, an instruction to open the door 400 in the farther direction from the user A is transmitted from the smartphone 200A to the drive mechanism 402 (see FIG. 21). In FIG. 22B, the door 400 is actually open.

Operation Example 3

Figure 23A:
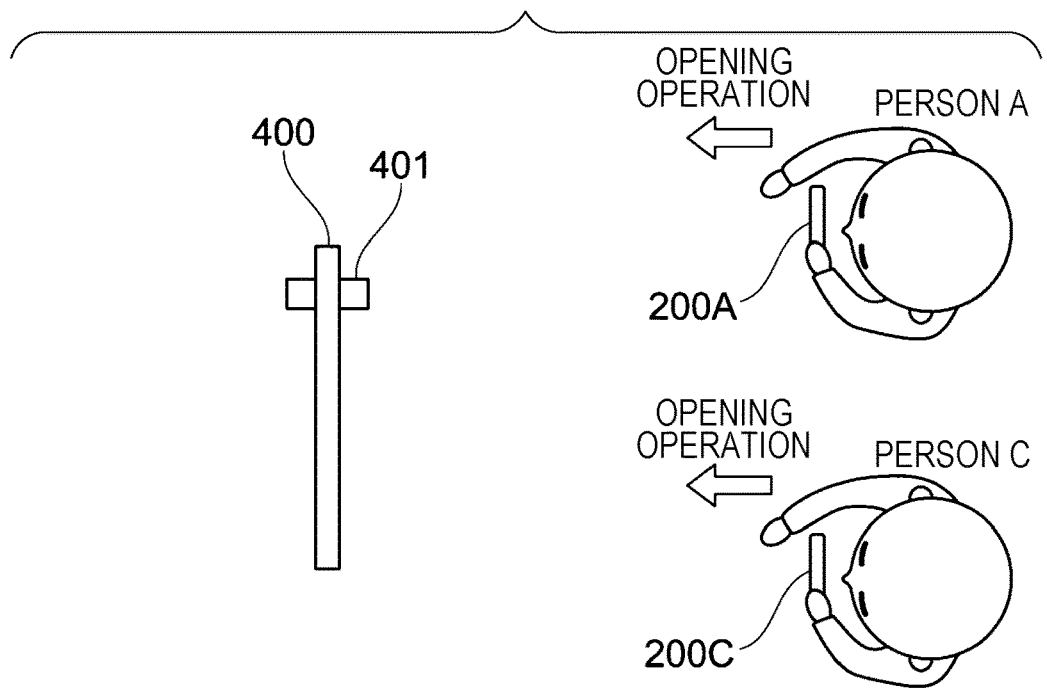
FIGS. 23A and 23B illustrate an example of an operation for a case where the operator includes two persons, namely the user A and the user C, with FIG. 23A illustrating a scene before an operation by a gesture and with FIG. 23B illustrating a scene after an operation by a gesture.
Figure 23B:
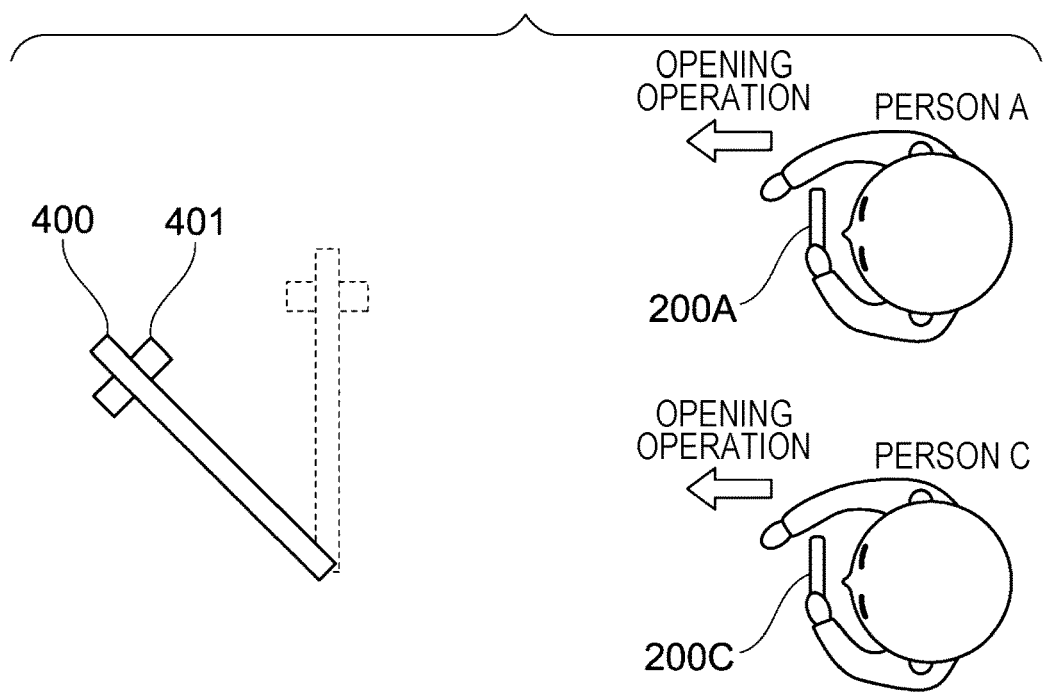

FIGS. 23A and 23B illustrate an example of an operation for a case where the operator includes two persons, namely the user A and the user C, with FIG. 23A illustrating a scene before an operation by a gesture and with FIG. 23B illustrating a scene after an operation by a gesture.

In the case of FIGS. 23A and 23B, both the user A and the user C perform an operation (opening operation) to open the door 400. Both the user A and the user C are permitted to perform an operation (opening operation) to open the door 400. It should be noted, however, that the sensitivity of an operation by the user C is corrected to half.

In this case, the operation receiving section 254 (see FIG. 4) detects an operation on the knob 401 by a different user (see step 109 in FIG. 6), and provides the drive mechanism 402 (see FIG. 21) with an instruction synthesized from the two operations.

In the example in FIGS. 23A and 23B, the directions of the operations by the two persons are the same as each other, and thus the operations act in the direction of increasing the speed at which the door 400 is opened.

A tactile feel that matches the speed of an operation by the other user or the magnitude of an acting force may be generated to be given.

Operation Example 4

Figure 24A:
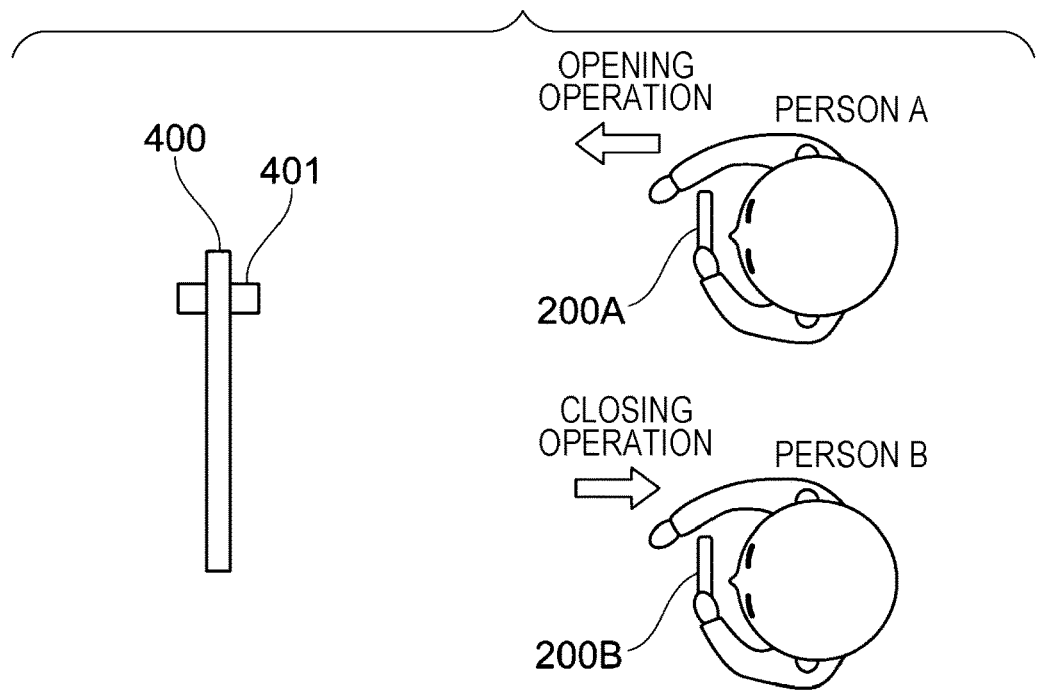
FIGS. 24A and 24B illustrate an example of an operation for a case where the operator includes two persons, namely the user A and the user B, with FIG. 24A illustrating a scene before an operation by a gesture and with FIG. 24B illustrating a scene after an operation by a gesture.
Figure 24B:
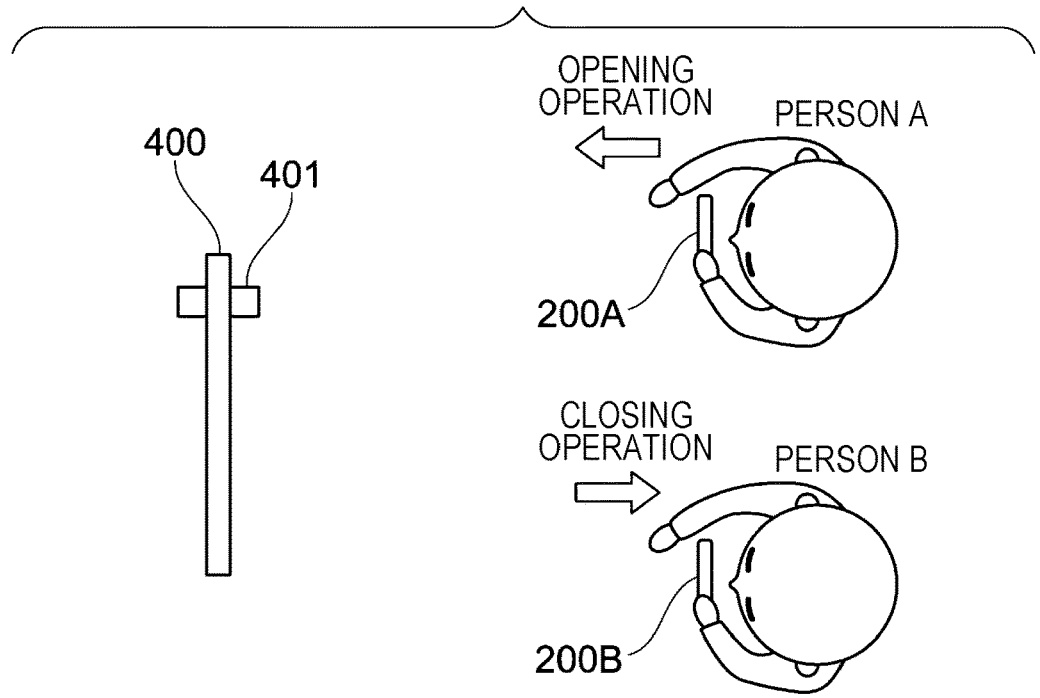

FIGS. 24A and 24B illustrate an example of an operation for a case where the operator includes two persons, namely the user A and the user B, with FIG. 24A illustrating a scene before an operation by a gesture and with FIG. 24B illustrating a scene after an operation by a gesture.

In the case of FIGS. 24A and 24B, the user A is performing an operation (opening operation) to open the door 400, while the user B is performing an operation (closing operation) to close the door 400.

The user A is permitted to perform an operation (opening operation) to open the door 400, and the user B is permitted to perform an operation (closing operation) to close the door 400. It should be noted, however, that the sensitivity of an operation by the user B is corrected to double.

Also in this case, the operation receiving section 254 (see FIG. 4) detects an operation on the knob 401 by a different user (see step 109 in FIG. 6), and provides the drive mechanism 402 (see FIG. 21) with an instruction synthesized from the two operations.

In the example in FIGS. 24A and 24B, the directions of the operations by the two persons are opposite to each other, and the operations after being weighted are balanced with each other. Therefore, the door 400 is maintained in a stationary state.

Also in this case, a tactile feel that matches the speed of an operation by the other user or the magnitude of an acting force may be generated to be given.

Operation Example 5

Figure 25A:
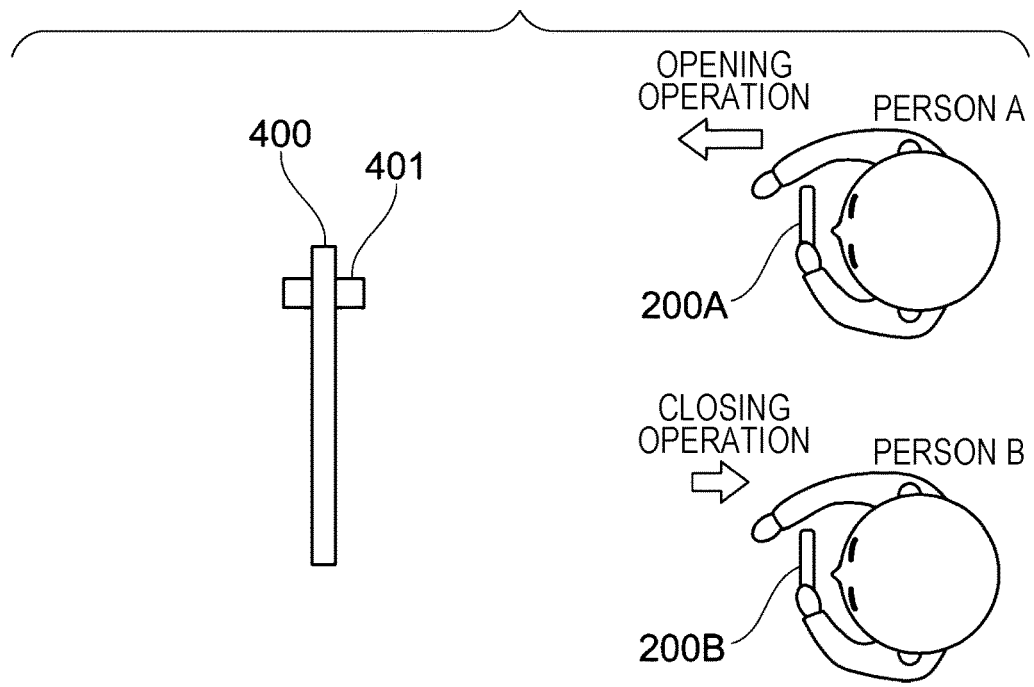
FIGS. 25A and 25B illustrate an example of an operation for a case where the operator includes two persons, namely the user A and the user B, with FIG. 25A illustrating a scene before an operation by a gesture and with FIG. 25B illustrating a scene after an operation by a gesture.
Figure 25B:
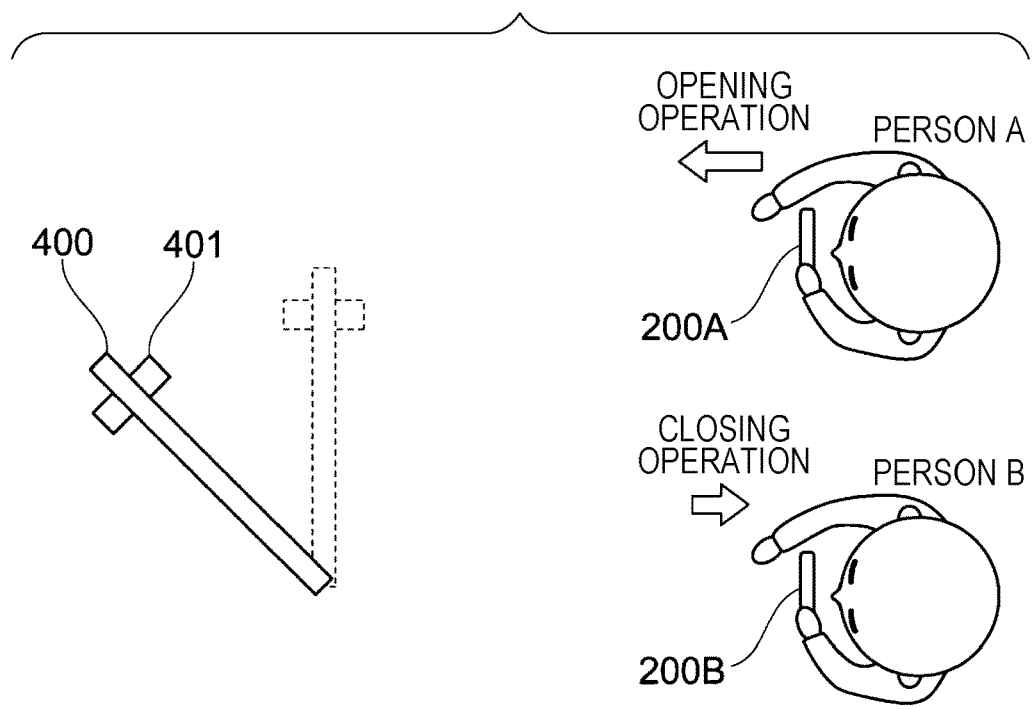

FIGS. 25A and 25B illustrate an example of an operation for a case where the operator includes two persons, namely the user A and the user B, with FIG. 25A illustrating a scene before an operation by a gesture and with FIG. 25B illustrating a scene after an operation by a gesture.

Also in the case of FIGS. 25A and 25B, the user A is performing an operation (opening operation) to open the door 400, while the user B is performing an operation (closing operation) to close the door 400.

It should be noted, however, that in the case of FIGS. 25A and 25B, the operation by the user A after being weighted is greater than the operation by the user B after being weighted. That is, a priority is given to the operation (opening operation) to open the door 400.

Therefore, the door 400 is driven to be opened. It should be noted, however, that the speed at which the door 400 is opened is lower than that for a case where the user A performs an operation alone.

Third Exemplary Embodiment

In the present embodiment, the operation target is a safe that has two operation elements.

FIG. 26 illustrates an example of a system according to a third exemplary embodiment.

Portions in FIG. 26 corresponding to those in FIG. 1 are denoted by the corresponding reference numerals.

The system illustrated in FIG. 26 includes a safe 500 and two smartphones 200A and 200B that capture an image of the safe 500.

The safe 500 is an example of an object that is present in the real space as the operation target.

A door 501 of the safe 500 illustrated in FIG. 26 is provided with two dial locks 502 and 503 that are not unlocked unless set to a registered number.

Figure 27:
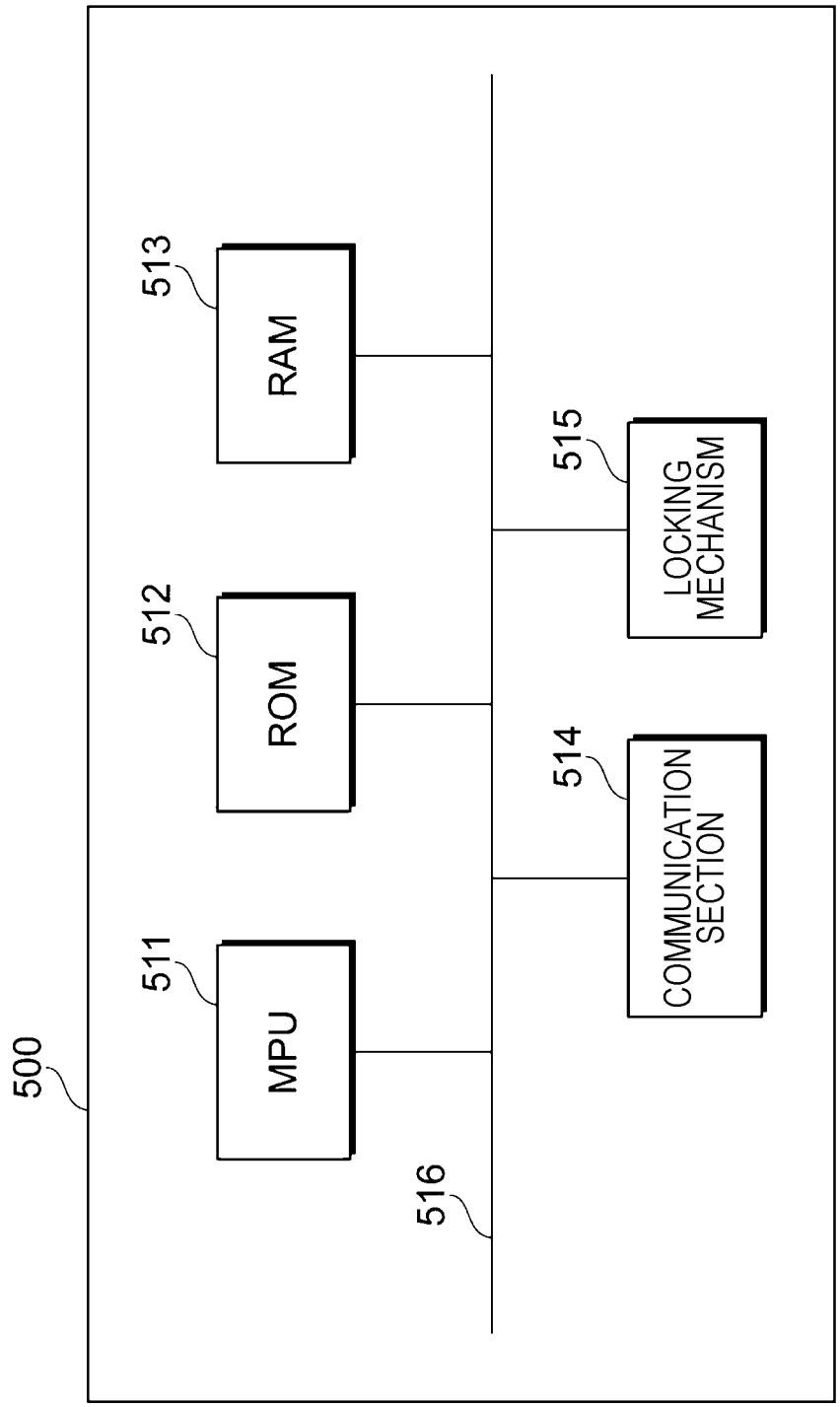
FIG. 27 illustrates an example of the hardware configuration of a safe.

FIG. 27 illustrates an example of the hardware configuration of the safe 500.

The safe 500 includes an MPU 511, a ROM 512 that stores data such as firmware, a RAM 513 that is used as a work area for a program, a communication section 514 that is used for communication with an external device such as the smartphone 200 (see FIG. 26), and a locking mechanism 515 that electrically unlocks and locks the safe 500. In the case of FIG. 27, the various sections are connected to each other through a bus 516. As a matter of course, communication among the various sections may be achieved by a component other than the bus 516.

FIG. 28 illustrates an example of a table 254A3 for operation of the safe 500 (see FIG. 26).

The content of the table 254A3 may be registered or corrected by an authorized user or manager.

In the case of the present embodiment, the table 254A3 stores, for each user, for example, whether or not the user is permitted to execute a specific operation, whether or not the user is permitted to execute an operation through cooperation with a different user, etc.

In the case of FIG. 28, for example, an unlocking operation 1 based on cooperation with the user B and an unlocking operation 3 based on cooperation with the user D are allocated to the user A.

The role of the user A in the unlocking operation 1 which is executed through cooperation with the user B is to operate the left dial lock 502. Therefore, even if the user A operates the right dial lock 503 in the unlocking operation 1, such an operation is invalid.

The role of the user A in the unlocking operation 3 which is executed through cooperation with the user D is to operate the right dial lock 503. Therefore, even if the user A operates the left dial lock 502 in the unlocking operation 3, such an operation is invalid.

Meanwhile, even if the user A operates one of the left dial lock 502 and the right dial lock 503 in cooperation with a different user (e.g. the user C), such an operation is invalid.

Only an unlocking operation 2 based on cooperation with the user C is allocated to the user B, for example.

The role of the user B in the unlocking operation 2 which is executed through cooperation with the user C is to operate the left dial lock 502. Therefore, even if the user B operates the right dial lock 503 in the unlocking operation 2, such an operation is invalid.

Meanwhile, even if the user B operates one of the dial locks 502 and 503 in cooperation with a different user (e.g. the user A or the user D), such an operation invalid.

Only the unlocking operation 2 based on cooperation with the user B is allocated to the user C, for example.

The role of the user C in the unlocking operation 2 which is executed through cooperation with the uses B is to operate the right dial lock 503. As a matter of course, even if the user C operates the left dial lock 502 in the case where the user C cooperates with the user B, such an operation is invalid. Meanwhile, even if the user C operates one of the left dial lock 502 and the right dial lock 503 in cooperation with a different user, such an operation is invalid.

Only the unlocking operation 3 based on cooperation with the user A is allocated to the user D, for example.

The role of the user D in the unlocking operation 3 which is executed through cooperation with the user A is to operate the left dial lock 502. As a matter of course, even if the user D operates the right dial lock 503 in the case where the user D cooperates with the user A, such an operation is invalid. Meanwhile, even if the user D operates one of the left dial lock 502 and the right dial lock 503 in cooperation with a different user, such an operation is invalid.

Although there is no user that is able to operate both the left and right dial locks 502 and 503 alone in FIG. 28, there may be such a user.

FIG. 28 does not indicate a condition for the timing to operate the left dial lock 502 and the right dial lock 503. However, an additional condition may be provided, such as a condition that the dial locks 502 and 503 should be operated at the same time (with a lag of a time length determined in advance permitted), and a condition as to which of the left dial lock 502 and the right dial lock 503 should be operated first. The order of operations may be different among combinations of users.

Examples of the operation element that is used for unlocking include a combination of an operation element that requires sequential input of alphanumeric characters and the dial locks, a combination of a key and the dial locks, a biometric authentication device (e.g. a fingerprint authentication device, a vein authentication device, and an iris authentication device), and a method that uses swipe or pattern authentication.

The operation element that requires sequential input of alphanumeric characters may be a type that requires input of characters, one character at a time, or a type that requires operation of buttons on which alphanumeric characters are printed.

Operation Example 1

FIG. 29 illustrates an example in which the user B captures an image of his/her own right hand 310 as superposed on a right dial lock image 503A.

The user B reaches his/her right hand 310 in the air while holding the smartphone 200B with his/her left hand (not illustrated), and performs a gesture of setting the right dial lock 503 to a number without contacting the right dial lock 503.

The manner of an operation by the user B illustrated in FIG. 29 corresponds to the unlocking operation 1 (see FIG. 28) which is performed in cooperation with the user A. Since this operation is valid, the user B has a tactile feel in his/her right hand 310.

In the case of FIG. 29, the right hand image 310A as an actual image is displayed on the liquid crystal display 223 together with a left dial lock image 502A, the right dial lock image 503A, and a door image 501A.

The user B performs operation to set the right dial lock image 503A to a number while seeing the right dial lock image 503A being displayed. In the case of FIG. 29, only the right hand image 310A of the user B is displayed.

In this event, the user A may be given a tactile feel when the user B performs an operation, and the user B may be given a tactile feel when the user A performs an operation.

Operation Example 2

In the case of Operation Example 1 discussed earlier, the manner of an operation by a different user may not be confirmed on the screen. Therefore, it is necessary for the user to confirm an operation by a different user with the line of sight of the user away from the screen, for example, in the case where it is necessary to match the timing of an operation by the user himself/herself and the timing of an operation by the different user, in the case where it is necessary to follow the order of execution determined in advance, etc.

Figure 30:
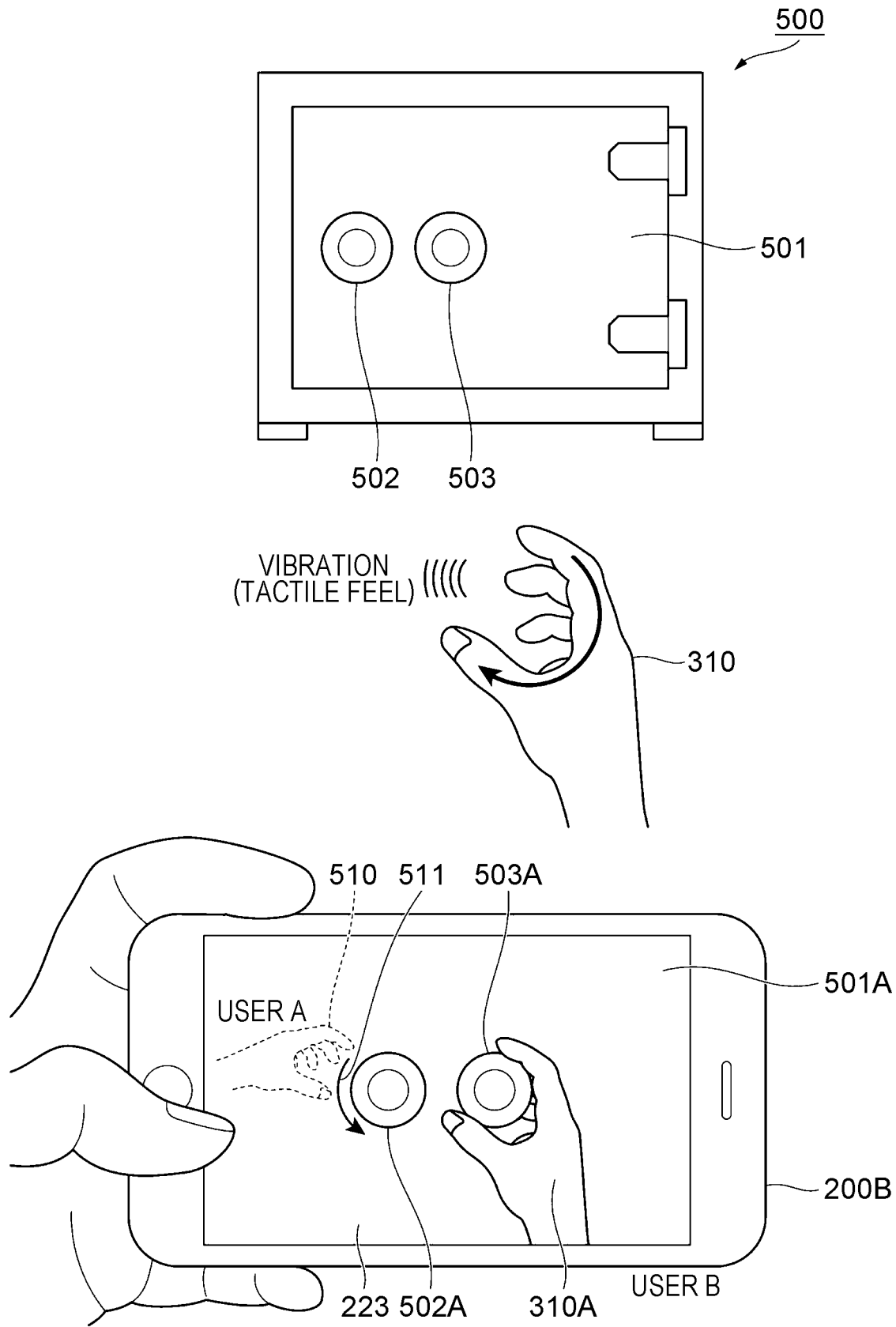
FIG. 30 illustrates a different example in which the user B captures an image of his/her own right hand as superposed on the right dial lock image.

FIG. 30 illustrates a different example in which the user B captures an image of his/her own right hand 310 as superposed on the right dial lock image 503A.

Portions in FIG. 30 corresponding to those in FIG. 29 are denoted by the corresponding reference numerals.

In the case of FIG. 30, the liquid crystal display 223 indicates that the cooperating user A is performing an operation through display of a virtual hand 510 correlated with the user A and an arrow 511 that indicates the direction of an operation on the left dial lock image 502A.

In FIG. 30, the fact that the user A is performing an operation is indicated through display of the virtual hand 510. However, such a fact may be indicated using characters, or by varying the manner of display of the left dial lock image 502A as the operation target. For example, characters Operating may be displayed, the color of the left dial lock image 502A may be varied, or the left dial lock image 502A may be flashed.

Operation Example 3

Figure 31:
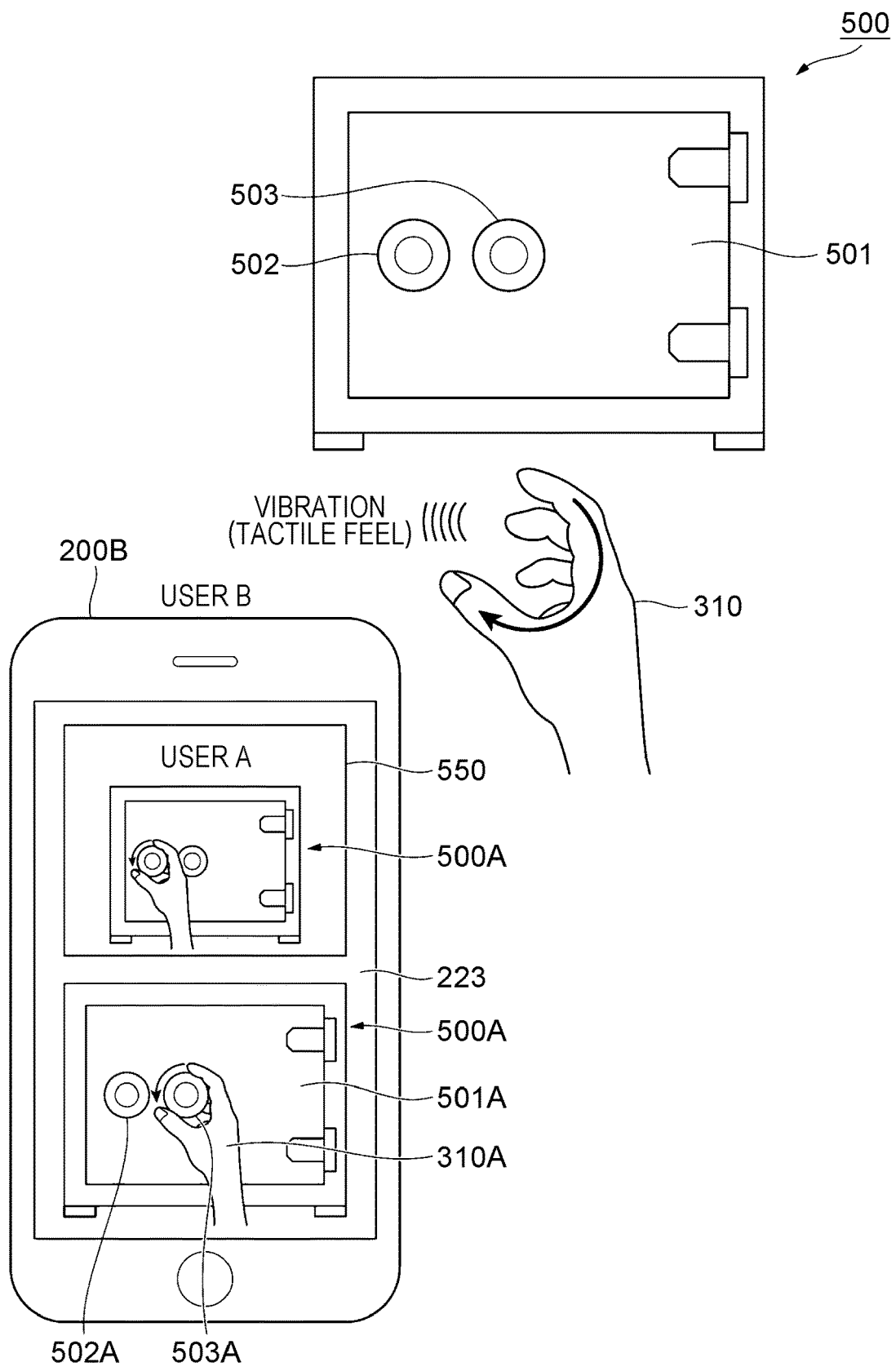
FIG. 31 illustrates a different example in which the user B captures an image of his/her own right hand as superposed on the right dial lock image.

FIG. 31 illustrates a different example in which the user B captures an image of his/her own right hand 310 as superposed on the right dial lock image 503A.

Portions in FIG. 31 corresponding to those in FIG. 29 are denoted by the corresponding reference numerals.

In the case of FIG. 31, a small screen 550 that displays an image being captured by the smartphone 200A which is operated by the cooperating user A is displayed on the liquid crystal display 223 in a part of an image being captured by the smartphone 200B which is operated by the user B.

In the case of the present embodiment, the image which is displayed on the small screen 550 is received from the cooperating smartphone 200A.

In FIG. 31, a title that indicates that the screen is used by the user A to perform an operation is displayed on the small screen 550. The small screen 550 is an example of an image that displays motion of a different user.

In the case of FIG. 31, a safe image 500A, the door image 501A, the left dial lock image 502A, the right dial lock image 503A, and the right hand image 310A are displayed on the liquid crystal display 223.

Similar images are displayed inside the small screen 550.

In the case of FIG. 31, the directions of operations of the left dial lock 502 and the right dial lock 503 are indicated by arrows.

As a matter of course, a similar image is displayed on the liquid crystal display 223 of the smartphone 200A which is held by the cooperating user A.

Fourth Exemplary Embodiment

In the case of the exemplary embodiment discussed earlier, the smartphone 200 directly captures an image of an object that is present in the real space. However, the image capture target may not actually exist in the space to be captured in an image.

Figure 32:
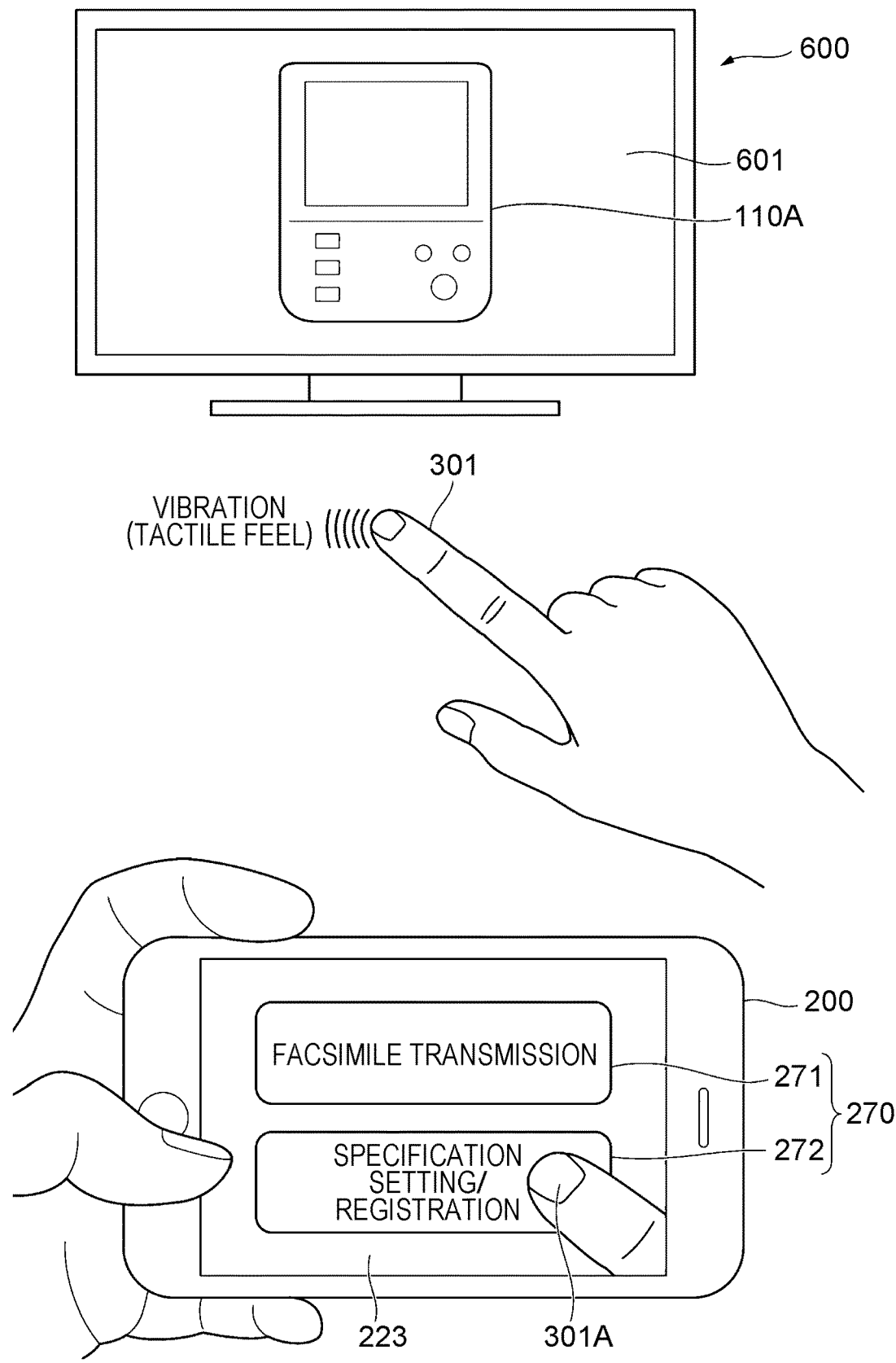
FIG. 32 illustrates a case where the image capture target is an image displayed on a display surface of a display apparatus.

FIG. 32 illustrates a case where the image capture target is an image displayed on a display surface 601 of a display apparatus 600.

The display apparatus 600 is a television receiver or a monitor, for example. The display surface 601 of the display apparatus 600 displays a user interface section image 110A of the image forming apparatus 100 (see FIG. 1).

The user interface section image 110A here is an image reproduced from image data obtained by capturing an image of the image forming apparatus 110 which actually exists.

Meanwhile, an image 270 (a button 271 for facsimile transmission and a button 272 for specification setting/ registration) in which a portion of the user interface section 110 is captured is displayed on the liquid crystal display 223 of the smartphone 200. In the case of FIG. 32, the index finger image 301A is displayed as superposed on the button 272 for specification setting/registration.

The present embodiment is the same as Operation Example 1 described with reference to FIG. 8 except that the target of image capture by the smartphone 200 differs from the image forming apparatus 100 (see FIG. 1) as the operation target.

Also in this case, it is possible to operate the image forming apparatus 100 in the same manner as in Operation Example 1 if the image forming apparatus 100 as the operation target is specified in advance from a list of devices that are communicable with the smartphone 200.

In the case where the corresponding image forming apparatus 100 may be specified using an image recognition technique even if the relationship between the user interface section image 110A being displayed on the display surface 601 and the image forming apparatus 100 as the operation target is unknown, the specified image forming apparatus 100 may be operated by a gesture from a remote location.

Fifth Exemplary Embodiment

In the case of the exemplary embodiment discussed earlier, the operation target object (or an image thereof) and a part of the body of the user are captured in an image at the same time using the camera 225 (see FIG. 3) provided to the smartphone 200. However, an image captured with a different camera may be used.

Figure 33:
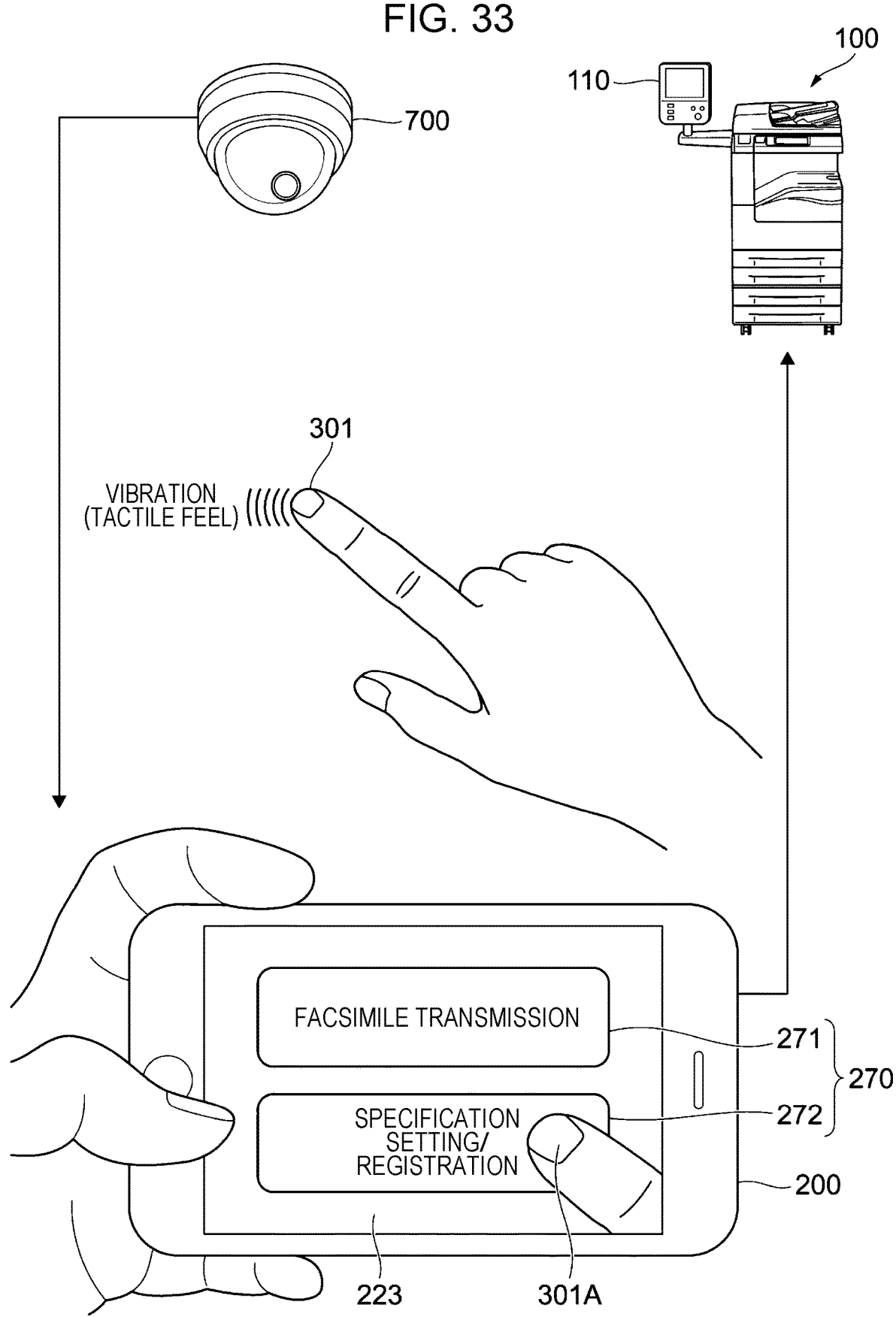
FIG. 33 illustrates an example in which an object captured by a camera other than the smartphone is operated by a gesture.

FIG. 33 illustrates an example in which an object captured by a camera other than the smartphone is operated by a gesture.

Portions in FIG. 33 corresponding to those in FIG. 9 are denoted by the corresponding reference numerals.

In FIG. 33, a web camera 700 is used as a camera that captures an image of the image forming apparatus 100.

A smartphone or a different image capture apparatus used by a different user may be used in place of the web camera 700.

In the case of the present embodiment, an image of the index finger 301 which is used to perform an operation is captured by the camera 225 (see FIG. 3) of the smartphone 200 which is held by the user as the operator, and displayed as superposed on the image forming apparatus image 100A (specifically, the button 272 for specification setting/registration which is displayed on the user interface section 110).

In the case of the exemplary embodiment, the index finger image 301A of the user is extracted from the image which is captured by the smartphone 200 to displayed, or a virtual fingertip icon or the like that has been prepared independently of the captured image is displayed.

In the case of the present embodiment, the smartphone 200 which has received an operation performed along with a gesture by the user transmits an instruction to the image forming apparatus 100 through a network (not illustrated).

Sixth Exemplary Embodiment

In the exemplary embodiment discussed earlier, the smartphone 200 (see FIG. 1) is described as an example of an information processing apparatus that receives an operation on the age forming apparatus 100 by capturing an image of a gesture by the user as the operator. However, a wearable information processing apparatus may also be used.

Figure 34:
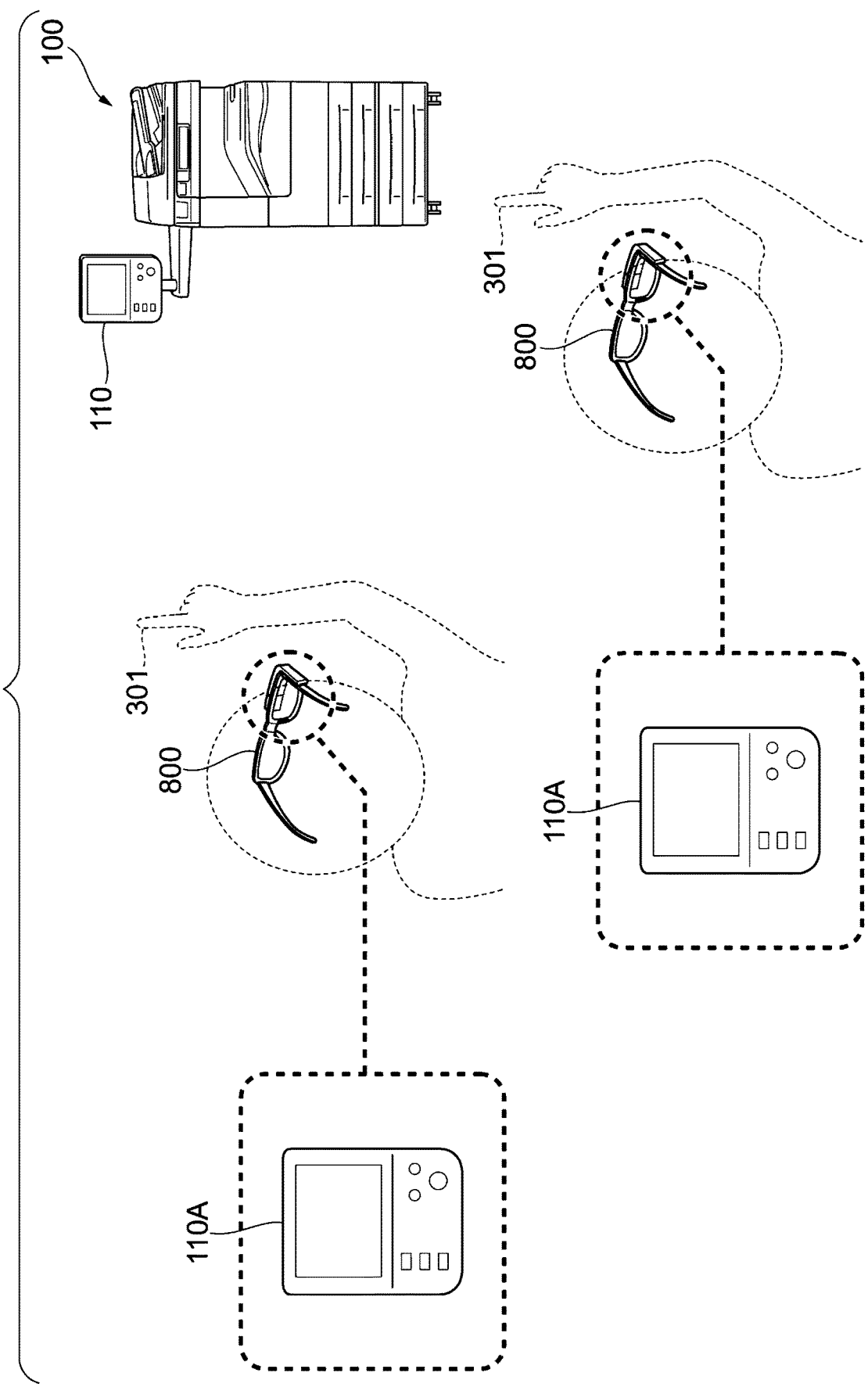
FIG. 34 illustrates an example of a system that uses a wearable information processing apparatus.

FIG. 34 illustrates an example of a system that uses a wearable information processing apparatus.

Portions in FIG. 34 corresponding to those in FIG. 1 are denoted by the corresponding reference numerals.

In the case of FIG. 34, the user wears a glass-type terminal 800. The hardware configuration (see FIG. 3) and the functional configuration (see FIG. 4) of the glass-type terminal 800 are the same as those of the smartphone 200. It should be noted, however, that the touch pad 226 (see FIG. 3) is not attached to the glass-type terminal 800.

In the case of the glass-type terminal 800, the user is able to use his/her two hands freely. Thus, the glass-type terminal 800 may be used to input an operation using two hands. For example, the glass-type terminal 800 may be used to provide an instruction for an operation to a humanoid robot. Therefore, it is possible to extend the range of operations that may be input compared to a case where the smartphone 200 is used.

The user in FIG. 34 sees the user interface section image 110A.

Seventh Exemplary Embodiment

While the operation target object which is displayed on the smartphone 200 is provided with a communication function in the exemplary embodiment discussed earlier, a case where the operation target is not provided with a communication function will be described.

Figure 35:
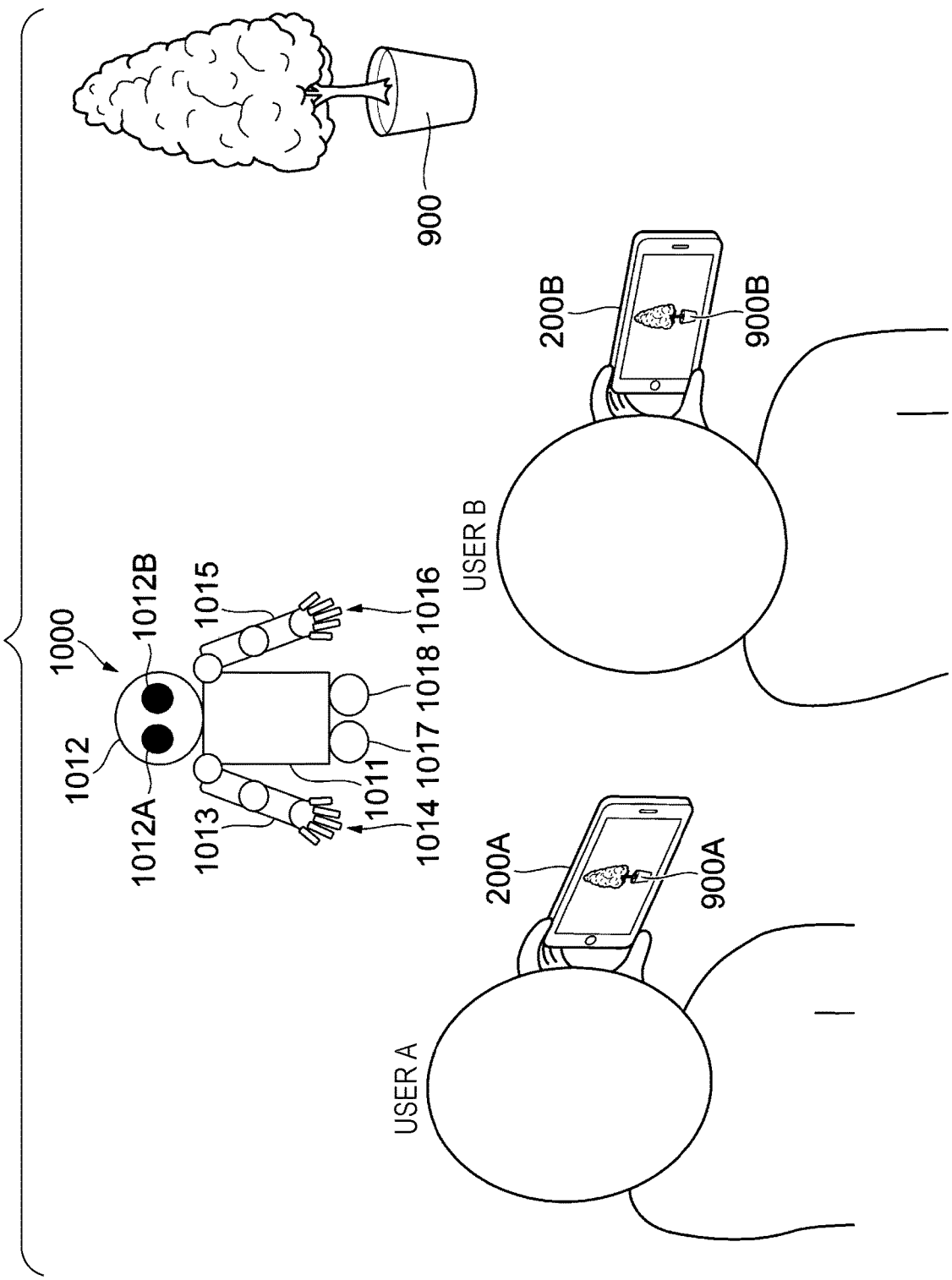
FIG. 35 illustrates a case where an instruction to move a potted plant is provided by a gesture.

FIG. 35 illustrates a case where an instruction to move a potted plant 900 is provided by a gesture.

Potted plant images 900A and 900B are displayed on the respective screens of the smartphones 200A and 200B. Also in this case, the right hand 310 in the actual space is moved without contacting the potted plant 900.

The potted plant 900 is not provided with a communication function or a self-running apparatus. Therefore, unlike the exemplary embodiment discussed earlier, even if motion of the right hand is captured in an image by the smartphone 200, the potted plant 900 may not be moved in accordance with such motion.

In the present embodiment, a humanoid robot 1000 that has a self-running function is designated as the destination of transmission of an operation by a gesture.

The robot 1000 as the destination of transmission of an instruction may be designated from a list of devices that are communicable with the smartphone 200, for example.

Although the robot 1000 illustrated in FIG. 35 has a humanoid appearance, the robot may have any appearance as long as a necessary function is provided. For example, the robot may look like an animal such as a dog or a cat, a plant such as a flower or a tree, or a vehicle or a craft such as a car (including a train) or an airplane.

The robot 1000 illustrated in FIG. 35 includes a body portion 1011, a head portion 1012, arms 1013 and 1015, hands 1014 and 1016, and legs 1017 and 1018.

The body portion 1011 stores an electronic component for signal processing. The body portion 1011 may be provided with a display device or an acoustic device.

The head portion 1012 is coupled to the body portion 1011 via a joint mechanism provided at a neck portion. In the case of the present embodiment, the joint mechanism is rotatable about three axes. Rotations about three axes include yaw (rotation about the z-axis), roll (rotation about the x-axis), and pitch (rotation about the y-axis), The joint mechanism here is an example of the movable section.

It is not necessary that the joint mechanism should be rotatable about all the three axes, and the joint mechanism may be rotatable about only one axis or two axes. Such rotation may be implemented by a motor (not illustrated), or may be implemented manually. A case where the head portion 1012 is fixed with respect to the body portion 1011 is not excluded.

The head portion 1012 is provided with eyes 1012A and 1012B. The eyes 1012A and 1012B may be disposed decoratively, or may include an image capture device, a projector, a lighting fixture, etc. built therein. The head portion 1012 may be provided with movable ears.

The arms 1013 and 1015 according to the present embodiment are coupled to the body portion 1011 via a joint mechanism. An overarm and a forearm of the arms 1013 and 1015 are coupled to each other via a joint mechanism. The joint mechanism here may be of a multi-axis type or a single-axis type as with that for the head portion 1012. Rotation about an axis may be implemented by a motor (not illustrated), or may be implemented manually. The arms 1013 and 1015 may be fixed to the body portion 1011. The joint mechanism here is also an example of the movable section.

The arms 1013 and 1015 may be bent to an angle determined in advance to be used to transport an object.

The hands 1014 and 1016 are coupled to the arms 1013 and 1015, respectively, via a joint mechanism provided at a wrist portion. A palm and fingers of the hands 1014 and 1016 are coupled to each other via a joint mechanism. The joint mechanism here may be of a multi-axis type or a single-axis type as with that for the head portion 1012. Rotation about an axis may be implemented by a motor (not illustrated), or may be implemented manually. In the case of the present embodiment, the hands 1014 and 1016 may grasp an object by opening and closing the fingers. The joint mechanism here is also an example of the movable section.

The hands 1014 and 1016 may be fixed with respect to the arms 1013 and 1015, respectively.

The legs 1017 and 1018 may be coupled to the body portion 1011 via a joint mechanism, or may be attached to the body portion 1011 as a self-running apparatus such as a wheel or a caterpillar.

In the case where the legs 1017 and 1018 are coupled to the body portion 1011 via a joint mechanism, the joint mechanism may be of a multi-axis type or a single-axis type as with that for the head portion 1012.

Rotation about an axis may be implemented by a motor (not illustrated), or may be implemented manually. The legs 1017 and 1018 may be fixed with respect to the body portion 1011. The joint mechanism here is also an example of the movable section.

Figure 36:
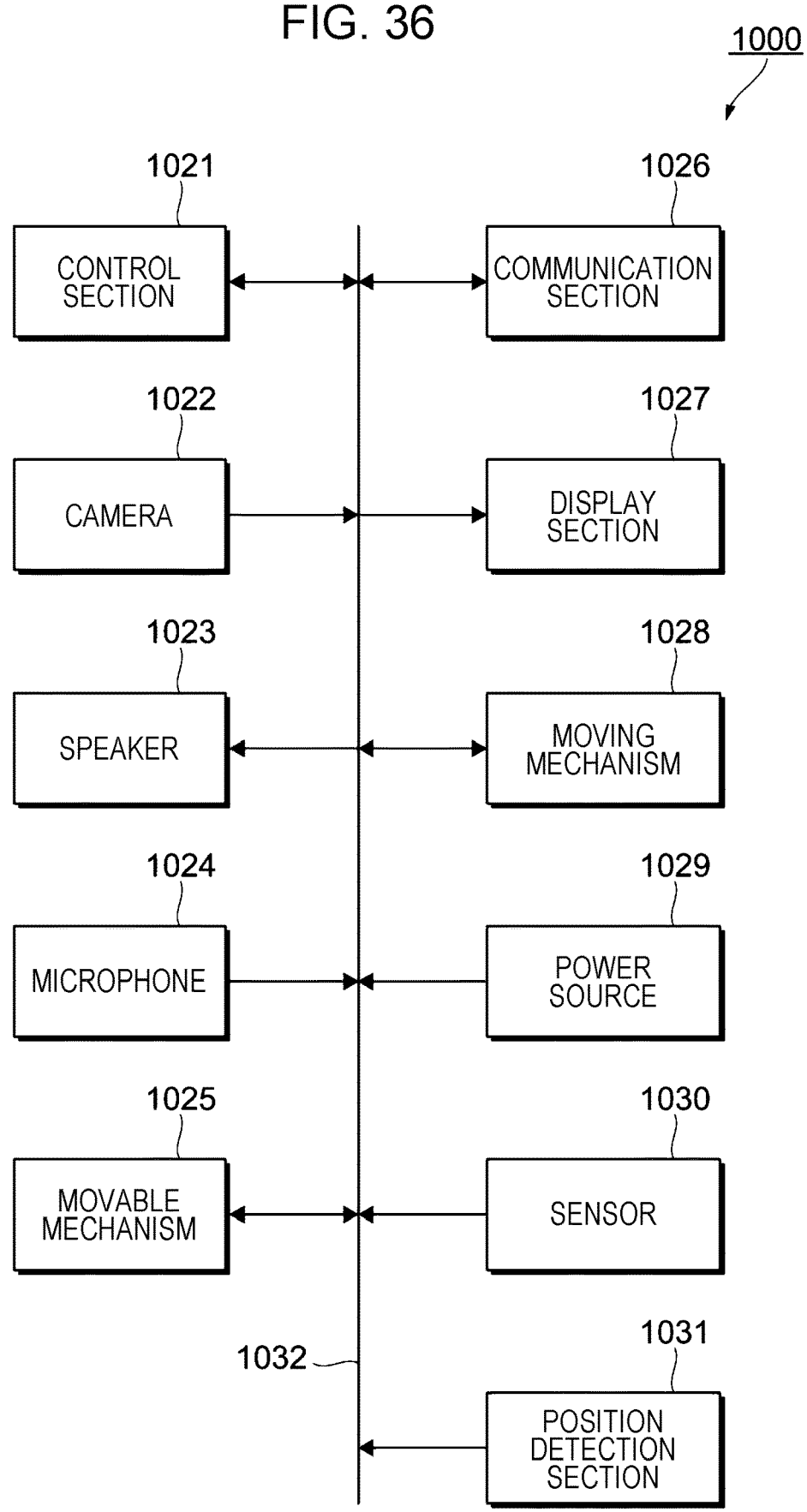
FIG. 36 illustrates the hardware configuration of a robot.

FIG. 36 illustrates the hardware configuration of the robot 1000.

The robot 1000 includes a control section 1021 that controls motion of the entire apparatus, a camera 1022 that captures an image of a scene around the robot, a speaker 1023 that reproduces voices for conversation, tunes, and sound effects, a microphone 1024 that is used to input or acquire a sound, a movable mechanism 1025 such as a joint mechanism, a communication section 1026 that is used to communicate with an external apparatus (e.g. a smartphone), a display section 1027 that displays an image, a moving mechanism 1028 that moves the entire apparatus, a power source 1029 that supplies electric power to the various sections, a sensor 1030 that is used to collect a state of the various sections and information on the surroundings, and a position detection section 1031 that is used to acquire positional information. Such sections are connected to each other via a bus 1032, for example.

It should be understood that the hardware configuration illustrated in FIG. 36 is exemplary. Thus, it is not necessary that the robot 1000 should be provided with all the functional sections discussed earlier.

The robot 1000 may be further provided with a functional section (not illustrated). For example, the robot 1000 may be provided with a power button, a storage apparatus (such as a hard disk apparatus or a semiconductor memory), a heat source (including a cooling source), or the like.

The control section 1021 is a so-called computer, and includes a CPU, a ROM, and a RAM. The ROM stores a program to be executed by the CPU. The CPU reads the program stored in the ROM, and executes the program using the RAM as a work area. The CPU controls operation of the various sections constituting the robot 1000 through execution of the program.

This program includes a program associated with implementation of an algorithm corresponding to artificial intelligence. The CPU and the RAM constituting the control section 1021 provide a computational resource that is used by the artificial intelligence.

The control section 1021 according to the present embodiment processes information acquired through the camera 1022, the microphone 1024, and the sensor 1030, for example, with the artificial intelligence to autonomously determine operation that matches the surrounding environment and the state of the robot 1000.

For example, a voice may be output through the speaker 1023, a message may be transmitted through the communication section 1026, and an image may be output through the display section 1027.

The control section 1021 may establish communication with the user through input and output of such information and motion of the movable mechanism 1025. Examples of application of communication include customer attendance and leading meetings.

The control section 1021 also has a function of collecting additional information through Internet search or communication with an external computer in the case where an unknown situation occurs, and finding a solution in accordance with the degree of similarity to an event found the search.

In the case of the present embodiment, examples of the information acquired by the control section 1021 include information obtained through the senses of sight, hearing, touch, taste, smell, and balance and the temperature.

The sense of sight is implemented through a process of recognizing an image captured by the camera 1022.

The sense of hearing is implemented through a process of recognizing a sound acquired by the microphone 1024.

Examples of the sense of touch include superficial sensation (such as touch, pain, and temperature), deep sensation (such as pressure, position, and vibration), and cortical sensation (such as two-point discrimination and three-dimensional discrimination).

The control section 1021 is able to discriminate differences in the sense of touch.

The senses of touch, taste, smell, and balance and the temperature are implemented through detection of information by the sensor 1030 of various types. The temperature includes an ambient temperature, an internal temperature, and the body temperature of a human or an animal.

The information acquired by the control section 1021 may include brain waves of a human or an animal. In this case, the brain waves may be obtained by the communication section 1026 receiving information sent from a brain wave detection device mounted to a human or the like.

In the case of the present embodiment, the camera 1022 is disposed at the positions of the eyes 1012A and 1012B (see FIG. 35).

In the case where a projector is used as the display section 1027, the projector may be disposed at one or both of the eyes 1012A and 1012B (see FIG. 1), for example. The projector may be disposed in the body portion 1011 or the head portion 1012.

The movable mechanism 1025 may be used not only to transport an object but also to express a feeling.

In the case where the movable mechanism 1025 is used to transport an object, the movable mechanism 1025 implements operation such as grasping, holding, and supporting the object, for example, through deformation of the arms 1013 and 1015 and the hands 1014 and 1016 (see FIG. 35).

In the case where the movable mechanism 1025 is used to express a feeling, the movable mechanism 1025 implements operation such as tilting the head, looking up, looking around, giving a cheer, and pointing a finger through drive of the head portion 1012, the arms 1013 and 1015, the hands 1014 and 1016, etc. (see FIG. 35), for example.

The communication section 1026 according to the present embodiment communicates with an external apparatus wirelessly.

The robot 1000 is provided with a number of communication sections 1026, the number corresponding to the number of communication methods used by an external apparatus assumed as the target of communication. Examples of the communication methods include infrared communication, visible light communication, proximity wireless communication, Wi-Fi (registered trademark), Bluetooth (registered trademark), RFID (registered trademark), ZigBee (registered trademark), IEEE 802.11a (registered trademark), MulteFire, and Low Power Wide Area (LPWA).

Bands used for ireless communication include a short-wavelength region (e.g. 800 MHz to 920 MHz) and a long-wavelength region (e.g. 2.4 GHz and 5 GHz).

The communication section 1026 and the external apparatus may be connected to each other using a communication cable.

The display section 1027 may be used to achieve visual communication with the user. For example, the display section 1027 may display characters and figures.

In the case where the display section 1027 is disposed at the head portion 1012, the display section 1027 may display a facial expression.

In the case of the present embodiment, a wheel or a caterpillar is used for the moving mechanism 1028. However, the robot 1000 may be moved by a pneumatic force using a propeller or a compressed air blowout mechanism.

A secondary battery is used for the power source 1029 according to the present embodiment. However, any of a primary battery, a fuel cell, and a solar cell that generate electric power may also be used.

Alternatively, the robot 1000 may receive supply of electric power from an external apparatus through a power cable, rather than from the power source 1029.

In the case of the present embodiment, the robot 1000 is provided with the position detection section 1031.

The position detection section 1031 utilizes a method in which location information is read from a global positioning system (GPS) signal, an Indoor MEssaging System (IMES) method in which an indoor position is measured using a signal that is equivalent to the GPS signal, a Wi-Fi position measurement method in which a position is measured from the intensity, arrival time, etc. of radio waves transmitted from a plurality of Wi-Fi access points, a base-station position measurement method in which a position is measured from the direction and delay time of a response to a signal regularly generated from a base station, a sound-wave position measurement method in which a position is measured by receiving ultrasonic waves in an inaudible range, a Bluetooth position measurement method in which a position is measured by receiving radio waves from a beacon that uses Bluetooth, a visible-light position measurement method in which a position is measured using positional information transferred by flashing on and off of illumination light from a light emitting diode (LED) or the like, or an autonomous navigation method in which the current position is measured using an acceleration sensor, a gyro sensor, etc., for example.

Figure 37:
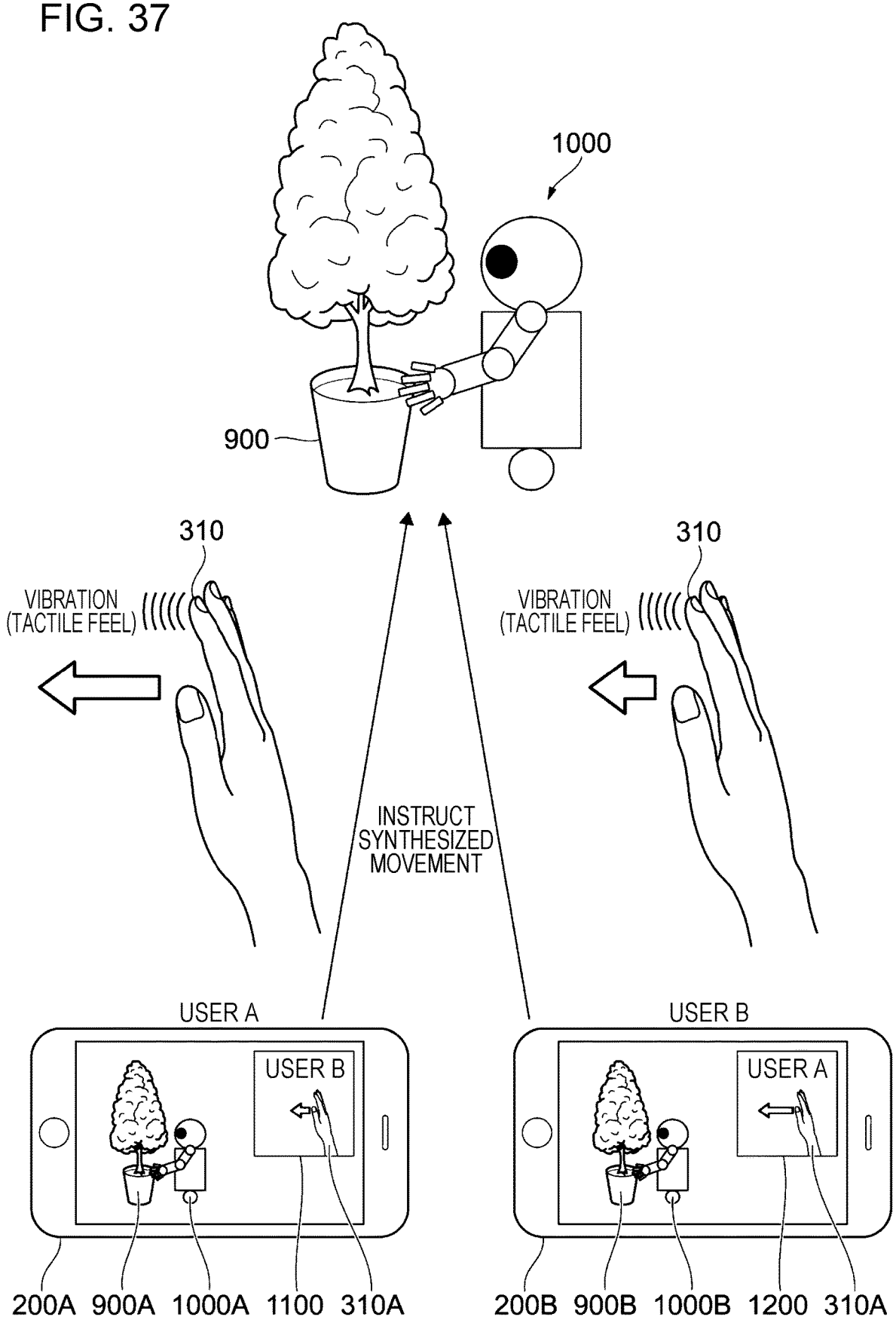
FIG. 37 illustrates an example in which a plurality of users cooperate with each other to provide the robot with an instruction to move the potted plant.

FIG. 37 illustrates an example in which a plurality of users cooperate with each other to provide the robot 1000 with an instruction to move the potted plant 900.

Portions in FIG. 37 corresponding to those in FIG. 35 are denoted by the corresponding reference numerals.

As in the other exemplary embodiments, the user A and the user B move their right hand 310 in front of their own smartphones 200A and 200B, respectively, and capture an image of such motion.

When the motion of the right hand 310 is received as an operation, the smartphone 200 instructs the robot 1000, which is able to move to the potted plant 900, to execute the operation. The operation here is to move the potted plant 900 sideways.

This operation for movement does not always require cooperation between the user A and the user B. Therefore, in the case where an operation on the potted plant 900 by a different user is detected (see step 109 in FIG. 6), the smartphones 200A and 200B provide the robot 1000 with an instruction obtained by combining the two operations. Operations to be combined may be given different weights different users as in the case of the second exemplary embodiment discussed earlier.

When the instruction for movement is received, the robot 1000 moves to the location of the potted plant 900 which is the target of movement, and grasps and moves the potted plant 900 sideways.

In this event, the smartphones 200A and 200B display a robot image 1000A grasping and moving the potted plant image 900A and the right hand image 310A.

In the case of FIG. 37, the right hand image 310A is displayed as a transparent image in order to facilitate confirmation of the potted plant image 900A and the robot image 1000A.

In the case of FIG. 37, in addition, a small screen 1100 that indicates how the different user B operates the same object is displayed on the smartphone 200A which is held by the user A, and a small screen 1200 that indicates how the different user A operates the same object is displayed on the smartphone 200B which is held by the user B. The small screens 1100 and 1200 are an example of an image that displays motion of a different user.

The small screens 1100 and 1200 also display an arrow that indicates the direction and the magnitude of an operation by each user.

In the case of FIG. 37, both the potted plant 900 and the robot 1000 actually exist in front of the eyes of the users, and thus there is little need to display the right hand image 310A in a transparent manner. In the case where the potted plant images 900A and 900B being displayed on the smartphones 200A and 200B, respectively, are not present in front of the eyes of the users (e.g. in the case where an image from a web camera is displayed on the smartphone 200), however, the right hand image 310A may be displayed in a transparent manner in order to facilitate confirmation of a scene in the actual space.

Other Exemplary Embodiments

While exemplary embodiments of the present disclosure have been described above, the technical scope of the present disclosure is not limited to the exemplary embodiments discussed above. It is apparent from the following claims that a variety of modifications and improvements that may be made to the exemplary embodiments discussed above also fall within the technical scope of the present disclosure.

For example, in the exemplary embodiments discussed earlier, the smartphone 200 (see FIG. 1) or the glass-type terminal (see FIG. 34) is used as an example of an information processing apparatus that provides an instruction for an operation on an object on the basis of a gesture. However, the information processing apparatus may be a tablet terminal, a so-called digital camera, a toy such as a gaming device, a watch-type wearable terminal, or a contact lens with a built-in camera, for example, that includes a camera for image capture, a display section, and a communication section. The contact lens with a built-in camera is an example of the wearable terminal, and is also called a "smart contact lens". The smart contact lens includes a camera, an antenna, and an electronic component (such as a transmission/reception circuit and a signal processing circuit), for example, disposed in a lens that is used in contact with a cornea, and is operable through blinking. Operations for shutter release, zooming, aperture setting, and focusing, for example, may be performed.

In the exemplary embodiments discussed earlier, the smartphone 200 executes a process of receiving motion of a part of the body of the user captured in an image by the smartphone 200 as an operation. However, the smartphone 200 may be used as a unit that captures an image of motion of a part of the body, and an external apparatus (e.g. a server) may execute a process of receiving such motion as an operation.

In the exemplary embodiments discussed earlier, the image forming apparatus 100 (see FIG. 1), the door 400 (see FIG. 19), and the safe 500 (see FIG. 31) are provided as examples of the operation target object. However, examples of the operation target object may also include a control column, a joystick, a shift lever, a blinker lever, a brake lever, a vehicle controller, a lighting fixture, an air-conditioner, an audio device, and a home electric appliance.

In the exemplary embodiments discussed earlier, the image forming apparatus 100 (see FIG. 1) is an apparatus that prints a two-dimensional image on a recording material such as paper. However, the image forming apparatus 100 may be a three-dimensional printer that forms a stereoscopic image (three-dimensional image).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus that is used in contact with a user, comprising:
 a processor programmed to function as:
  a detection unit that detects a motion of the user in a real space performed without contacting an object that is present in the real space; and
  a control unit that instructs the object to execute a specific function in a case where a plurality of motions by users for a common object are detected, the specific function being correlated with the plurality of motions, wherein, in a case where directions of operations corresponding to the plurality of motions are opposite to each other, the specific function is executed in accordance with a result of combining the plurality of motions.

2. The information processing apparatus according to claim 1, wherein the plurality of motions are different operations prescribed in advance.

3. The information processing apparatus according to claim 2, wherein allocation of operations required from individual users differs in accordance with a combination of the users.

4. The information processing apparatus according to claim 2, wherein the plurality of motions associated with execution of the specific function are set for each specific function.

5. The information processing apparatus according to claim 1, wherein the plurality of motions are correlated with different operation elements associated with the specific function.

6. The information processing apparatus according to claim 1, wherein the plurality of motions are set for each object.

7. The information processing apparatus according to claim 1, wherein the plurality of motions are correlated with the same operation element associated with the specific function.

8. The information processing apparatus according to claim 1, wherein the control unit combines the plurality of motions after adjusting magnitudes of the plurality of detected motions among the users.

9. The information processing apparatus according to claim 1, wherein, in a case where directions of operations corresponding to the plurality of motions are the same as each other, the specific function is executed in accordance with a result of combining the plurality of motions.

10. The information processing apparatus according to claim 1, wherein the user is notified of presence of an operation of the common object by a different user.

11. The information processing apparatus according to claim 10, wherein an image that indicates a motion of the different user is displayed together with an image for work in which the object is captured.

12. The information processing apparatus according to claim 10, wherein an image that is used by the different user for an operation is displayed together with a screen in which the object is captured.

13. The information processing apparatus according to claim 1, wherein a tactile feel that matches the detected motion is generated and applied to the user.

14. The information processing apparatus according to claim 13, wherein the tactile feel differs in accordance with the specific function.

15. The information processing apparatus according to claim 13, wherein the tactile feel is applied in a case where an operation for the specific function is received.

16. The information processing apparatus according to claim 13, wherein the tactile feel is generated in accordance with a motion of a different user.

17. The information processing apparatus according to claim 16, wherein the tactile feel is generated in accordance with the motion of the different user for a common portion.

18. A non-transitory computer readable medium storing a program causing a computer that is used in contact with a user to function as:

a detection unit that detects a motion of the user in a real space performed without contacting an object that is present in the real space; and a control unit that instructs the object to execute a specific function in a case where a plurality of motions by users for a common object are detected, the specific function being correlated with the plurality of motions, wherein, in a case where directions of operations corresponding to the plurality of motions are opposite to each other, the specific function is executed in accordance with a result of combining the plurality of motions.

19. An information processing apparatus that is used in contact with a user, comprising:

detection means for detecting a motion of the user in a real space performed without contacting an object that is present in the real space; and control means for instructing the object to execute a specific function in a case where a plurality of motions by users for a common object are detected, the specific function being correlated with the plurality of motions, wherein, in a case where directions of operations corresponding to the plurality of motions are opposite to each other, the specific function is executed in accordance with a result of combining the plurality of motions.

* * * * *